United States Patent
Chen

(10) Patent No.: US 12,248,126 B2
(45) Date of Patent: Mar. 11, 2025

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/626,233

(22) Filed: Apr. 3, 2024

(65) Prior Publication Data
US 2024/0264412 A1    Aug. 8, 2024

Related U.S. Application Data

(63) Continuation of application No. 17/135,575, filed on Dec. 28, 2020, now Pat. No. 11,982,791, which is a (Continued)

(30) Foreign Application Priority Data

Mar. 7, 2018 (TW) ................................ 107107655

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
None
See application file for complete search history.

(56) References Cited

U.S. PATENT DOCUMENTS 5,303,087 A    4/1994   Hayakawa et al.
10,409,037 B2 *  9/2019   Oinuma ............. G02B 27/0025
(Continued)

FOREIGN PATENT DOCUMENTS

CN       105676422 A     6/2016
CN       105911677 A     8/2016
(Continued)

OTHER PUBLICATIONS

TW Office Action dated Jun. 8, 2018 as received in Application No. 107107655.
(Continued)

*Primary Examiner* — Robert E. Tallman
(74) *Attorney, Agent, or Firm* — Maschoff Brennan

(57) ABSTRACT

A photographing optical lens assembly includes seven lens elements which are, in order from an object side to an image side: a first lens element, a second lens element, a third lens element, a fourth lens element, a fifth lens element, a sixth lens element and a seventh lens element. The first lens element has negative refractive power. The third lens element has positive refractive power. The fourth lens element has negative refractive power. The sixth lens element has an image-side surface being convex in a paraxial region thereof. The seventh lens element with negative refractive power has an image-side surface being concave in a paraxial region thereof. The image-side surface of the seventh lens element has at least one critical point in an off-axis region thereof. There is an air gap in a paraxial region between all adjacent lens elements of the seven lens elements.

20 Claims, 21 Drawing Sheets

Related U.S. Application Data continuation of application No. 16/109,493, filed on Aug. 22, 2018, now Pat. No. 10,908,393.

(56) References Cited

U.S. PATENT DOCUMENTS

| | | | |
|---|---|---|---|
| 10,473,897 B2* | 11/2019 | Sato | G02B 1/041 |
| 10,502,931 B2 | 12/2019 | Huang | |
| 2013/0271851 A1 | 10/2013 | Souma | |
| 2017/0108662 A1* | 4/2017 | Lee | G02B 13/04 |
| 2017/0139186 A1* | 5/2017 | Tang | G02B 9/64 |
| 2017/0153428 A1* | 6/2017 | Li | G02B 13/06 |
| 2017/0184821 A1* | 6/2017 | Shi | G02B 9/64 |
| 2018/0188493 A1 | 7/2018 | Huang | |
| 2018/0196225 A1* | 7/2018 | Chang | G02B 13/0045 |
| 2018/0196226 A1 | 7/2018 | Chang et al. | |
| 2018/0196233 A1 | 7/2018 | Chang et al. | |
| 2018/0196234 A1 | 7/2018 | Chang et al. | |
| 2018/0196235 A1 | 7/2018 | Chang et al. | |
| 2018/0196239 A1 | 7/2018 | Chang et al. | |
| 2018/0239117 A1 | 8/2018 | Lee et al. | |
| 2020/0064596 A1 | 2/2020 | Huang | |
| 2020/0400924 A1* | 12/2020 | Xu | G02B 13/04 |

FOREIGN PATENT DOCUMENTS

| | | |
|---|---|---|
| CN | 108181701 A | 6/2018 |
| JP | H04-218012 A | 8/1992 |
| JP | 2016-188895 A | 11/2016 |
| JP | 2017-037342 A | 2/2017 |
| TW | I614517 B | 2/2018 |
| WO | 2019/093377 A1 | 5/2019 |

OTHER PUBLICATIONS

CN Office Action dated Dec. 28, 2020 as received in Application No. 201810239135.1.
CN Office Action dated Mar. 23, 2022 as received in Application No. 202110992497.X.
CN Office Action dated Mar. 24, 2022 as received in Application No. 202111011939.4.
CN Office Action dated Mar. 25, 2022 as received in Application No. 202110980540.0.

* cited by examiner

PHOTOGRAPHING OPTICAL LENS ASSEMBLY, IMAGE CAPTURING UNIT AND ELECTRONIC DEVICE

RELATED APPLICATIONS

This application is a continuation patent application of U.S. application Ser. No. 17/135,575, filed on Dec. 28, 2020, which is a continuation patent application of U.S. application Ser. No. 16/109,493, filed on Aug. 22, 2018, which claims priority to Taiwan Application 107107655, filed on Mar. 7, 2018, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality has been one of the indispensable features of an optical system nowadays. Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, a desirable size of the aperture, miniaturization or required field of view. Accordingly, the present disclosure provides an optical system satisfying the aforementioned requirements.

SUMMARY

According to one aspect of the present disclosure, a photographing optical lens assembly includes seven lens elements. The seven lens elements are, in order from an object side to an image side, a first lens element, a second lens element, a third lens element, a fourth lens element, a fifth lens element, a sixth lens element and a seventh lens element. The first lens element has negative refractive power. The third lens element has positive refractive power. The fourth lens element has negative refractive power. The sixth lens element has an image-side surface being convex in a paraxial region thereof. The seventh lens element with negative refractive power has an image-side surface being concave in a paraxial region thereof, and the image-side surface of the seventh lens element has at least one critical point in an off-axis region thereof. There is an air gap in a paraxial region between all adjacent lens elements of the photographing optical lens assembly. When a focal length of the first lens element is f1, a focal length of the second lens element is f2, and a focal length of the third lens element is f3, the following conditions are satisfied:

$$|f3/f2| < 1.20; \text{ and}$$

$$|f1/f2| < 0.95.$$

According to another aspect of the present disclosure, an image capturing unit includes the aforementioned photographing optical lens assembly and an image sensor, wherein the image sensor is disposed on an image surface of the photographing optical lens assembly.

According to still another aspect of the present disclosure, an electronic device includes the aforementioned image capturing unit.

According to yet another aspect of the present disclosure, a photographing optical lens assembly includes seven lens elements. The seven lens elements are, in order from an object side to an image side, a first lens element, a second lens element, a third lens element, a fourth lens element, a fifth lens element, a sixth lens element and a seventh lens element. The first lens element has negative refractive power. The third lens element has positive refractive power. The fourth lens element has negative refractive power. The sixth lens element has an image-side surface being convex in a paraxial region thereof. The seventh lens element with negative refractive power has an object-side surface being convex in a paraxial region thereof and an image-side surface being concave in a paraxial region thereof, and the image-side surface of the seventh lens element has at least one critical point in an off-axis region thereof. When a focal length of the second lens element is f2, and a focal length of the third lens element is f3, the following condition is satisfied:

$$|f3/f2| < 1.20.$$

According to yet still another aspect of the present disclosure, an electronic device includes at least two image capturing units. The at least two image capturing units face the same direction, and each of the at least two image capturing units has a single focal point. The at least two image capturing units includes a first image capturing unit and a second image capturing unit. The first image capturing unit includes a lens system and a first image sensor. The first image sensor is disposed on an image surface of the lens system. The second image capturing unit includes the aforementioned photographing optical lens assembly and a second image sensor. The second image sensor is disposed on an image surface of the photographing optical lens assembly. The first image capturing unit has a field of view ranging from 60 degrees to 90 degrees, and the second image capturing unit has a field of view ranging from 90 degrees to 180 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
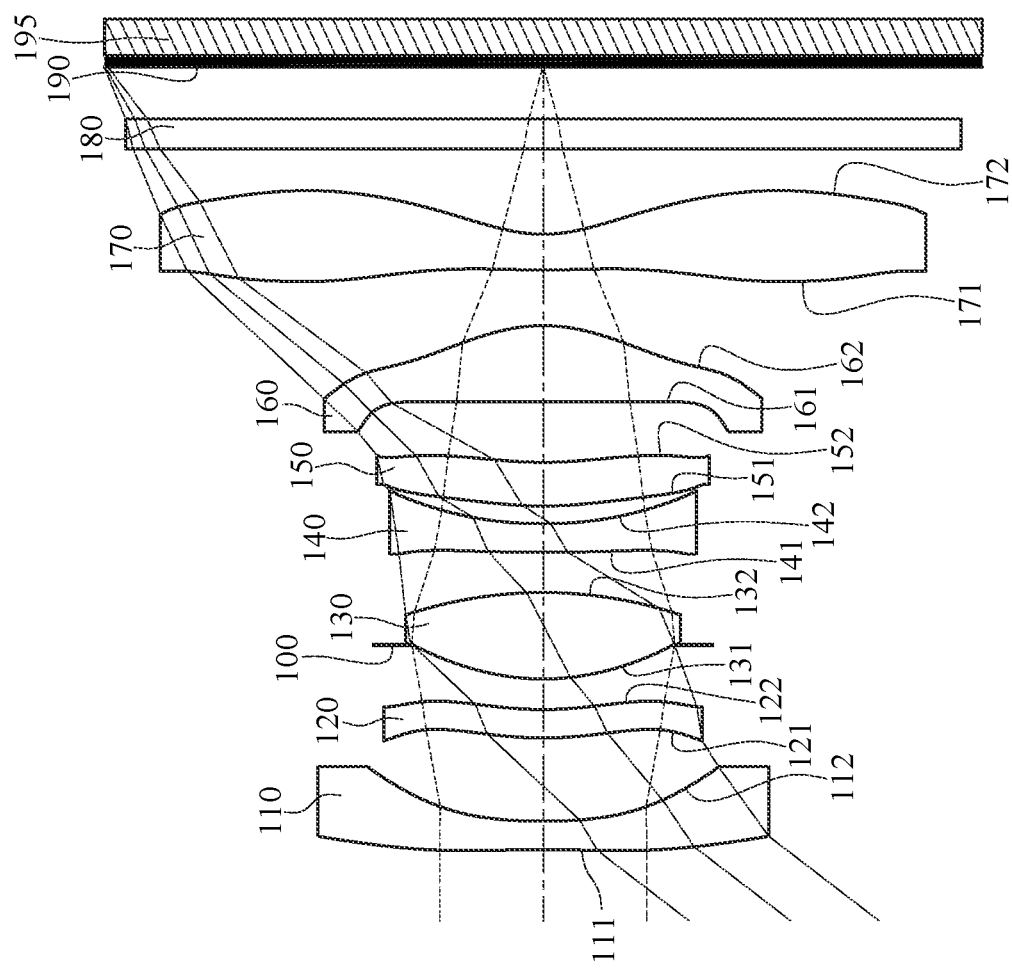
FIG. 1 is a schematic view of an image capturing unit according to the 1st embodiment of the present disclosure.

A photographing optical lens assembly includes seven lens elements. The seven lens elements are, in order from an object side to an image side, a first lens element, a second lens element, a third lens element, a fourth lens element, a fifth lens element, a sixth lens element and a seventh lens element.

There can be an air gap in a paraxial region between all adjacent lens elements of the seven lens elements of the photographing optical lens assembly; that is, each of the first through the seventh lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to misalignment and it is thereby not favorable for the image quality. Therefore, having an air gap in a paraxial region between every adjacent two of the seven lens elements of the photographing optical lens assembly in the present disclosure is favorable for preventing the problem associated with the cemented lens elements while improving the yield rate.

The first lens element has negative refractive power; therefore, it is favorable for providing a wide-angle lens configuration. The first lens element can have an image-side surface being concave in a paraxial region thereof; therefore, it is favorable for controlling the shape of the first lens element so as to prevent the shape of the first lens element from being overly curved, thereby achieving compactness.

The second lens element can have an object-side surface being convex in a paraxial region thereof. Therefore, it is favorable for correcting aberrations so as to improve the image quality.

The third lens element has positive refractive power; therefore, it is favorable for providing sufficient light convergence capability and reducing the total track length of the photographing optical lens assembly so as to achieve compactness. The third lens element can have an object-side surface being convex in a paraxial region thereof and an image-side surface being convex in a paraxial region thereof; therefore, it is favorable for enhancing the light convergence capability of the third lens element.

The fourth lens element with negative refractive power can have an object-side surface being convex in a paraxial region thereof and an image-side surface being concave in a paraxial region thereof. Therefore, it is favorable for correcting aberrations generated by the third lens element.

The fifth lens element can have an object-side surface being convex in a paraxial region thereof and an image-side surface being concave in a paraxial region thereof. Therefore, it is favorable for correcting spherical aberration and astigmatism so as to improve the image quality.

The sixth lens element has an image-side surface being convex in a paraxial region thereof; therefore, it is favorable for correcting off-axis aberrations. The sixth lens element can have positive refractive power; therefore, it is favorable for reducing the total track length of the photographing optical lens assembly.

Figure 21:
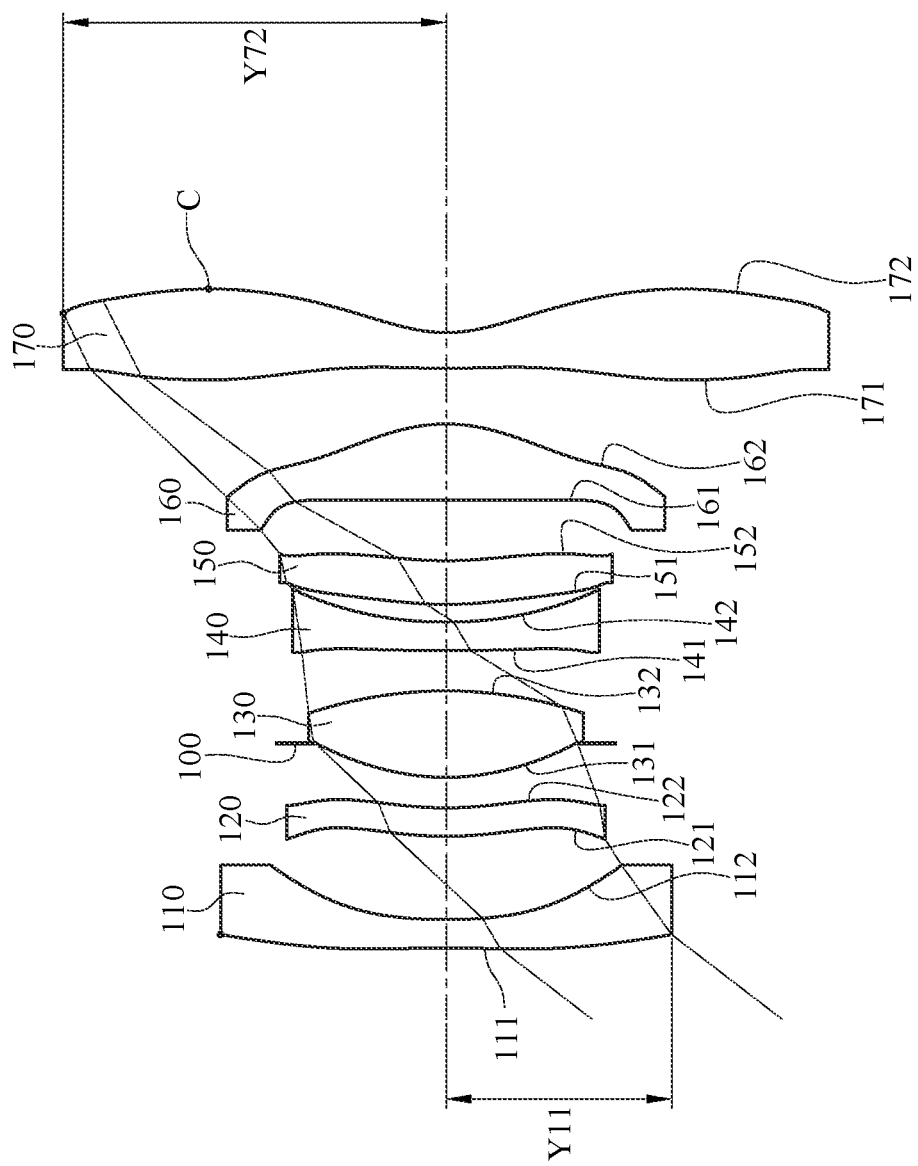
FIG. 21 shows a schematic view of Y11, Y72 and a critical point on the image-side surface of the seventh lens element according to the 1st embodiment of the present disclosure.

The seventh lens element with negative refractive power can have an object-side surface being convex in a paraxial region thereof, and the seventh lens element has an image-side surface being concave in a paraxial region thereof; therefore, it is favorable for reducing the back focal length of the photographing optical lens assembly. The image-side surface of the seventh lens element has at least one critical point in an off-axis region thereof; therefore, it is favorable for correcting the Petzval sum to flatten the image surface, as well as correcting off-axis aberrations. Please refer to FIG. 21, which shows a schematic view of a critical point C on the image-side surface of the seventh lens element according to the 1st embodiment of the present disclosure.

When a focal length of the second lens element is f2, and a focal length of the third lens element is f3, the following condition is satisfied: $|f3/f2|<1.20$. Therefore, it is favorable for preventing the refractive power of the second lens element from being overly strong so as to prevent light rays from overly refracted, thereby reducing surface reflection and aberrations. Preferably, the following condition can also be satisfied: $|f3/f2|<0.75$.

When a focal length of the first lens element is f1, and the focal length of the second lens element is f2, the following condition can be satisfied: $|f1/f2|<0.95$. Therefore, it is favorable for providing the first lens element with sufficient refractive power so as to broaden the field of view.

When a focal length of the photographing optical lens assembly is f, a focal length of the sixth lens element is f6, and a focal length of the seventh lens element is f7, the following condition can be satisfied: $0.75<|f/f6|+|f/f7|$. Therefore, it is favorable for the lens elements on the image side to have sufficient refractive power so as to improve the image quality. Preferably, the following condition can be satisfied: $1.50<|f/f6|+|f/f7|$. More preferably, the following condition can also be satisfied: $1.50<|f/f6|+|f/f7|<4.50$.

When an Abbe number of the second lens element is V2, the following condition can be satisfied: $10<V2<32$. Therefore, it is favorable for correcting chromatic aberration so as to improve peripheral image quality.

When an f-number of the photographing optical lens assembly is Fno, the following condition can be satisfied: $1.0<Fno<2.0$. Therefore, it is favorable for providing a large aperture so as to capture a sufficient amount of image data in low-light conditions (e.g., night-time) or in a short exposure time (e.g., dynamic photography); furthermore, it is favorable for increasing imaging speed so as to achieve high image quality in a well-lit condition.

When an axial distance between an object-side surface of the first lens element and an image surface is TL, and a maximum image height of the photographing optical lens assembly (half of a diagonal length of an effective photosensitive area of an image sensor) is ImgH, the following condition can be satisfied: $TL/ImgH<2.50$. Therefore, it is favorable for obtaining a balance between the field of view and the total track length so as to keep the photographing optical lens assembly compact.

When a maximum field of view of the photographing optical lens assembly is FOV, the following condition can be satisfied: $100 [deg.]<FOV<200 [deg.]$. Therefore, it is favorable for achieving a wide angle effect.

When a central thickness of the second lens element is CT2, and a central thickness of the third lens element is CT3, the following condition can be satisfied: $CT2/CT3<1.20$. Therefore, it is favorable for preventing the first through the third lens elements from overly close to one another, such that the lens elements of various characteristics are able to function properly within a sufficient space between all adjacent lens elements, and thereby meeting the requirements of wide field of view and compactness. Preferably, the following condition can also be satisfied: $CT2/CT3<0.60$.

When a maximum effective radius of the object-side surface of the first lens element is Y11, and a maximum effective radius of the image-side surface of the seventh lens element is Y72, the following condition can be satisfied: $0.50<Y11/Y72<1.20$. Therefore, it is favorable for the lens elements having a suitable size for compact electronic devices, while preventing improper space utilization in the photographing optical lens assembly due to the first lens element being overly large and insufficient incident light for clear images due to the seventh lens element being overly small. Preferably, the following condition can also be satisfied: $0.60<Y11/Y72<1.20$. Please refer to FIG. 21, which shows a schematic view of Y11 and Y72 according to the 1st embodiment of the present disclosure.

When the maximum effective radius of the image-side surface of the seventh lens element is Y72, and the focal length of the photographing optical lens assembly is f, the following condition can be satisfied: $0.75<Y72/f$. Therefore, the size of the seventh lens element is favorable for compact electronic devices.

When the focal length of the photographing optical lens assembly is f, and a curvature radius of the object-side surface of the first lens element is R1, the following condition can be satisfied: $f/R1 \leq 0$. Therefore, it is favorable for preventing the shape of the first lens element from overly curved, so as to achieve a compact configuration of the photographing optical lens assembly.

When the focal length of the first lens element is f1, the focal length of the second lens element is f2, the focal length of the third lens element is f3, a focal length of the fourth lens element is f4, a focal length of the fifth lens element is f5, the focal length of the sixth lens element is f6, and the focal length of the seventh lens element is f7, the following conditions can be satisfied: $|f1/f5|<1.0$; $|f2/f5|<1.0$; $|f3/f5|<1.0$; $|f4/f5|<1.0$; $|f6/f5|<1.0$; and $|f7/f5|<1.0$. In other words, an absolute value of the ratio between the focal length of every lens element other than the fifth lens element and the focal length of the fifth lens element is smaller than 1.0. Therefore, it is favorable for the fifth lens element to have proper refractive power for correcting aberrations and to improve peripheral image quality.

When the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and the focal length of the seventh lens element is f7, the following conditions can be satisfied: $|f7/f1|<1.0$; $|f7/f2|<1.0$; $|f7/f3|<1.0$; $|f7/f4|<1.0$; $|f7/f5|<1.0$; and $|f7/f6|<1.0$. In other words, an absolute value of the ratio between the focal length of the seventh lens element and the focal length of every lens element other than the seventh lens element is smaller than 1.0. Therefore, it is favorable for enhancing the characteristic of the seventh lens element having negative refractive power to reduce the back focal length and move the exit pupil towards the object side, and thereby increasing relative illuminance on the peripheral image.

When a sum of axial distances between adjacent lens elements of the seven lens elements is $\Sigma AT$, an axial distance between the first lens element and the second lens element is T12, and an axial distance between the fifth lens element and the sixth lens element is T56, the following condition can be satisfied: $1.0<\Sigma AT/(T12+T56)<2.25$. Therefore, the lens elements of various characteristics on the image side are able to function properly within a sufficient space between all adjacent lens elements.

When a curvature radius of an object-side surface of the sixth lens element is R11, and a curvature radius of the image-side surface of the sixth lens element is R12, the following condition can be satisfied: $0.5<(R11+R12)/(R11-R12)<3.0$. Therefore, it is favorable for adjusting the shape and the refractive power of the sixth lens element so as to prevent image correction problems due to large differences in the refractive power of lens elements on the image side of the photographing optical lens assembly.

When the central thickness of the second lens element is CT2, the axial distance between the first lens element and the second lens element is T12, and an axial distance between the second lens element and the third lens element is T23, the following condition can be satisfied: $CT2/(T12+T23)<1.0$. Therefore, it is favorable for preventing the first through the third lens elements from overly close to one another, such that the lens elements of various characteristics are able to function properly within a sufficient space between adjacent lens elements, thereby meeting the requirements of wide field of view and compactness.

When an Abbe number of the sixth lens element is V6, and an Abbe number of the seventh lens element is V7, the following condition can be satisfied: 1.2<V6/V7<3.5. Therefore, it is favorable for the sixth lens element and the seventh lens element to correct chromatic aberration so as to improve peripheral image quality.

According to the present disclosure, the aforementioned features and conditions can be utilized in numerous combinations so as to achieve corresponding effects.

According to the present disclosure, the lens elements of the photographing optical lens assembly can be made of either glass or plastic material. When the lens elements are made of glass material, the refractive power distribution of the photographing optical lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the photographing optical lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, an image surface of the photographing optical lens assembly, based on the corresponding image sensor, can be flat or curved, especially a curved surface being concave facing towards the object side of the photographing optical lens assembly.

According to the present disclosure, an image correction unit, such as a field flattener, can be optionally disposed between the lens element closest to the image side of the photographing optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the photographing optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens assembly and thereby provides a wider field of view for the same.

According to the above description of the present disclosure, the following specific embodiments are provided for further explanation.

1st Embodiment

Figure 2:
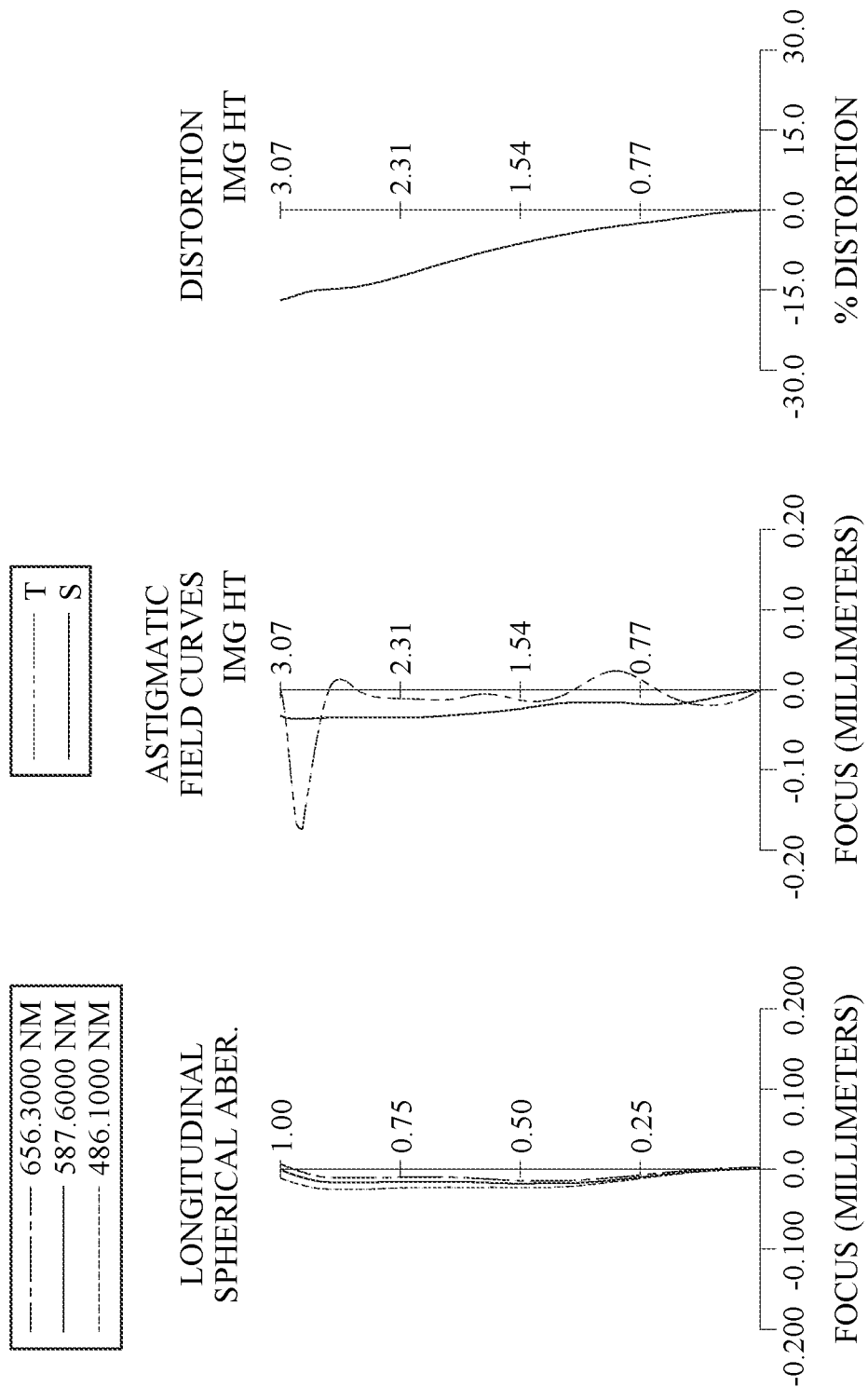
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 195. The photographing optical lens assembly includes, in order from an object side to an image side, a first lens element 110, a second lens element 120, an aperture stop 100, a third lens element 130, a fourth lens element 140, a fifth lens element 150, a sixth lens element 160, a seventh lens element 170, an IR-cut filter 180 and an image surface 190. The photographing optical lens assembly includes seven single and non-cemented lens elements (110, 120, 130, 140, 150, 160 and 170) with no additional lens element disposed between each of the adjacent seven lens elements, wherein there is an air gap between every adjacent lens element.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with positive refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The image-side surface 172 of the seventh lens element 170 has at least one critical point in an off-axis region thereof.

The IR-cut filter 180 is made of glass material and located between the seventh lens element 170 and the image surface 190, and will not affect the focal length of the photographing optical lens assembly. The image sensor 195 is disposed on or near the image surface 190 of the photographing optical lens assembly.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical lens assembly of the image capturing unit according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=2.88 millimeters (mm), Fno=1.98, HFOV=52.5 degrees (deg.).

When the maximum field of view of the photographing optical lens assembly is FOV, the following condition is satisfied: FOV=105.0 [deg.].

When an Abbe number of the second lens element 120 is V2, the following condition is satisfied: V2=19.5.

When an Abbe number of the sixth lens element 160 is V6, and an Abbe number of the seventh lens element 170 is V7, the following condition is satisfied:

$$V6/V7 = 1.38.$$

When a central thickness of the second lens element 120 is CT2, an axial distance between the first lens element 110 and the second lens element 120 is T12, and an axial distance between the second lens element 120 and the third lens element 130 is T23, the following condition is satisfied: CT2/(T12+T23)=0.25. In this embodiment, an axial distance between two adjacent lens elements is an air gap in a paraxial region between the two adjacent lens elements.

When the central thickness of the second lens element 120 is CT2, and a central thickness of the third lens element 130 is CT3, the following condition is satisfied: CT2/CT3=0.33.

When a sum of axial distances between adjacent lens elements of the seven lens elements is ΣAT, the axial distance between the first lens element 110 and the second lens element 120 is T12, and an axial distance between the fifth lens element 150 and the sixth lens element 160 is T56, the following condition is satisfied: Σ/(12+T56)=2.00.

When an axial distance between the object-side surface 111 of the first lens element 110 and the image surface 190 is TL, and a maximum image height of the photographing optical lens assembly is ImgH, the following condition is satisfied: TL/ImgH=1.79.

When the focal length of the photographing optical lens assembly is f, and a curvature radius of the object-side surface 111 of the first lens element 110 is R1, the following condition is satisfied: f/R1=−0.35.

When a curvature radius of the object-side surface 161 of the sixth lens element 160 is R11, and a curvature radius of the image-side surface 162 of the sixth lens element 160 is R12, the following condition is satisfied: (R11+R12)/(R11−R12)=1.01.

When a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, and a focal length of the seventh lens element 170 is f7, the following conditions are satisfied: |f1/|f5|=0.08; |f2/|f5|=2.90; |f3/|f5|=0.03; |f4/|f5|=0.08; |f6/|f5|=0.03; and |f7/|f5|=0.03.

When the focal length of the first lens element 110 is f1, the focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, and the focal length of the seventh lens element 170 is f7, the following conditions are satisfied: |f7/f1|=0.40; |f7/f2|=0.01; |f7/f3|=0.99; |f7/f4|=0.41; |f7/f5|=0.03; and |f7/f6|=0.99.

When the focal length of the second lens element 120 is f2, and the focal length of the third lens element 130 is f3, the following condition is satisfied: |f3/f2|=0.01.

When the focal length of the first lens element 110 is f1, and the focal length of the second lens element 120 is f2, the following condition is satisfied: |f1/f2|=0.03.

When the focal length of the photographing optical lens assembly is f, the focal length of the sixth lens element 160 is f6, and the focal length of the seventh lens element 170 is f7, the following condition is satisfied: |f/f6|+|f/f7|=2.81.

When a maximum effective radius of the object-side surface 111 of the first lens element 110 is Y11, and a maximum effective radius of the image-side surface 172 of the seventh lens element 170 is Y72, the following condition is satisfied: Y11/Y72=0.59.

When the maximum effective radius of the image-side surface 172 of the seventh lens element 170 is Y72, and the focal length of the photographing optical lens assembly is f, the following condition is satisfied: Y72/f=0.93.

The detailed optical data of the 1st embodiment are shown in Table 1 and the aspheric surface data are shown in Table 2 below.

TABLE 1

1st Embodiment
f = 2.88 mm, Fno = 1.98, HFOV = 52.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −8.125 (ASP) | 0.200 | Plastic | 1.545 | 56.1 | −5.04 |
| 2 | | 4.186 (ASP) | 0.585 | | | | |
| 3 | Lens 2 | 2.478 (ASP) | 0.200 | Plastic | 1.671 | 19.5 | −175.77 |
| 4 | | 2.348 (ASP) | 0.456 | | | | |
| 5 | Ape. Stop | Plano | −0.241 | | | | |
| 6 | Lens 3 | 1.671 (ASP) | 0.608 | Plastic | 1.544 | 56.0 | 2.05 |
| 7 | | −2.904 (ASP) | 0.284 | | | | |
| 8 | Lens 4 | 43.552 (ASP) | 0.200 | Plastic | 1.671 | 19.5 | −4.91 |
| 9 | | 3.054 (ASP) | 0.124 | | | | |
| 10 | Lens 5 | 2.548 (ASP) | 0.307 | Plastic | 1.544 | 56.0 | 60.61 |
| 11 | | 2.644 (ASP) | 0.428 | | | | |
| 12 | Lens 6 | −199.229 (ASP) | 0.534 | Plastic | 1.544 | 56.0 | 2.06 |
| 13 | | −1.118 (ASP) | 0.392 | | | | |
| 14 | Lens 7 | 8.121 (ASP) | 0.250 | Plastic | 1.559 | 40.4 | −2.04 |
| 15 | | 0.986 (ASP) | 0.600 | | | | |
| 16 | IR-cut filter | Plano | 0.210 | Glass | 1.517 | 64.2 | — |
| 17 | | Plano | 0.365 | | | | |
| 18 | Image | Plano | — | | | | |

Note:
Reference wavelength is 587.6 nm (d-line).

TABLE 2

Aspheric Coefficients

| Surface # | 1 | 2 | 3 | 4 | 6 |
|---|---|---|---|---|---|
| k = | −8.6541E+01 | 8.9386E+00 | −1.9351E+01 | −1.8309E+01 | −4.4945E+00 |
| A4 = | 1.4050E−01 | 2.2708E−01 | −2.0179E−02 | −6.1755E−02 | 5.2370E−02 |
| A6 = | −1.6737E−01 | −5.3948E−01 | −3.3968E−02 | −1.2781E−02 | −1.3358E−02 |
| A8 = | 2.0525E−01 | 1.6714E+00 | −6.3888E−01 | −5.5922E−01 | 3.5625E−02 |
| A10 = | −2.3375E−01 | −3.7682E+00 | 2.4664E+00 | 2.4002E+00 | −4.5672E−02 |
| A12 = | 1.9856E−01 | 5.4653E+00 | −5.3258E+00 | −5.7667E+00 | 1.3349E−02 |
| A14 = | −1.1236E−01 | −5.0334E+00 | 6.8135E+00 | 8.3042E+00 | 1.2507E−02 |
| A16 = | 3.9377E−02 | 2.8396E+00 | −5.1024E+00 | −6.9914E+00 | −2.9559E−03 |
| A18 = | −7.6753E−03 | −8.9659E−01 | 2.0911E+00 | 3.1850E+00 | −1.3768E−02 |
| A20 = | 6.3353E−04 | 1.2179E−01 | −3.6377E−01 | −6.0613E−01 | 1.4201E−02 |

| Surface # | 7 | 8 | 9 | 10 | 11 |
|---|---|---|---|---|---|
| k = | −2.8016E+00 | −8.9710E+01 | 4.6734E+00 | −3.6848E+01 | −7.1162E+01 |
| A4 = | 1.6862E−02 | 1.4204E−01 | 6.2868E−02 | −1.4154E−02 | 9.6525E−02 |
| A6 = | −6.5351E−02 | −3.9906E−01 | −3.8282E−02 | −1.0253E−01 | −5.9375E−01 |
| A8 = | 8.9064E−02 | 4.6349E−01 | −3.4218E−01 | 5.1143E−01 | 1.0937E+00 |
| A10 = | −4.2507E−02 | −2.8255E−01 | 6.3686E−01 | −1.2422E+00 | −7.1540E−01 |
| A12 = | −2.5782E−02 | 1.1446E−02 | 9.3230E−02 | 1.9314E+00 | −1.1032E+00 |
| A14 = | 4.3755E−03 | 4.0538E−02 | −1.5784E+00 | −1.9821E+00 | 2.8685E+00 |
| A16 = | 1.2059E−02 | 2.3417E−03 | 2.0800E+00 | 1.3211E+00 | −2.7097E+00 |
| A18 = | 1.3077E−02 | 1.0907E−03 | −1.1742E+00 | −5.0484E−01 | 1.2409E+00 |
| A20 = | −4.0304E−03 | −1.8842E−03 | 2.5410E−01 | 8.1400E−02 | −2.2641E−01 |

| Surface # | 12 | 13 | 14 | 15 |
|---|---|---|---|---|
| k = | 5.8680E+01 | −2.3757E+00 | 3.4522E+00 | −5.3544E+00 |
| A4 = | 3.9209E−02 | 1.5626E−01 | −1.8156E−01 | −1.2795E−01 |
| A6 = | −3.8394E−01 | −2.3588E−01 | 1.5380E−01 | 9.0030E−02 |
| A8 = | 1.6791E+00 | 4.2674E−01 | −9.0310E−02 | −4.5026E−02 |
| A10 = | −3.9969E+00 | −4.9809E−01 | 4.0455E−02 | 1.5034E−02 |
| A12 = | 5.7812E+00 | 4.3329E−01 | −1.2723E−02 | −3.2773E−03 |
| A14 = | −5.2612E+00 | −2.7259E−01 | 2.6056E−03 | 4.5271E−04 |
| A16 = | 2.9426E+00 | 1.0471E−01 | −3.2635E−04 | −3.7193E−05 |
| A18 = | −9.2967E−01 | −2.0959E−02 | 2.2587E−05 | 1.5895E−06 |
| A20 = | 1.2701E−01 | 1.6405E−03 | −6.6046E−07 | −2.5019E−08 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
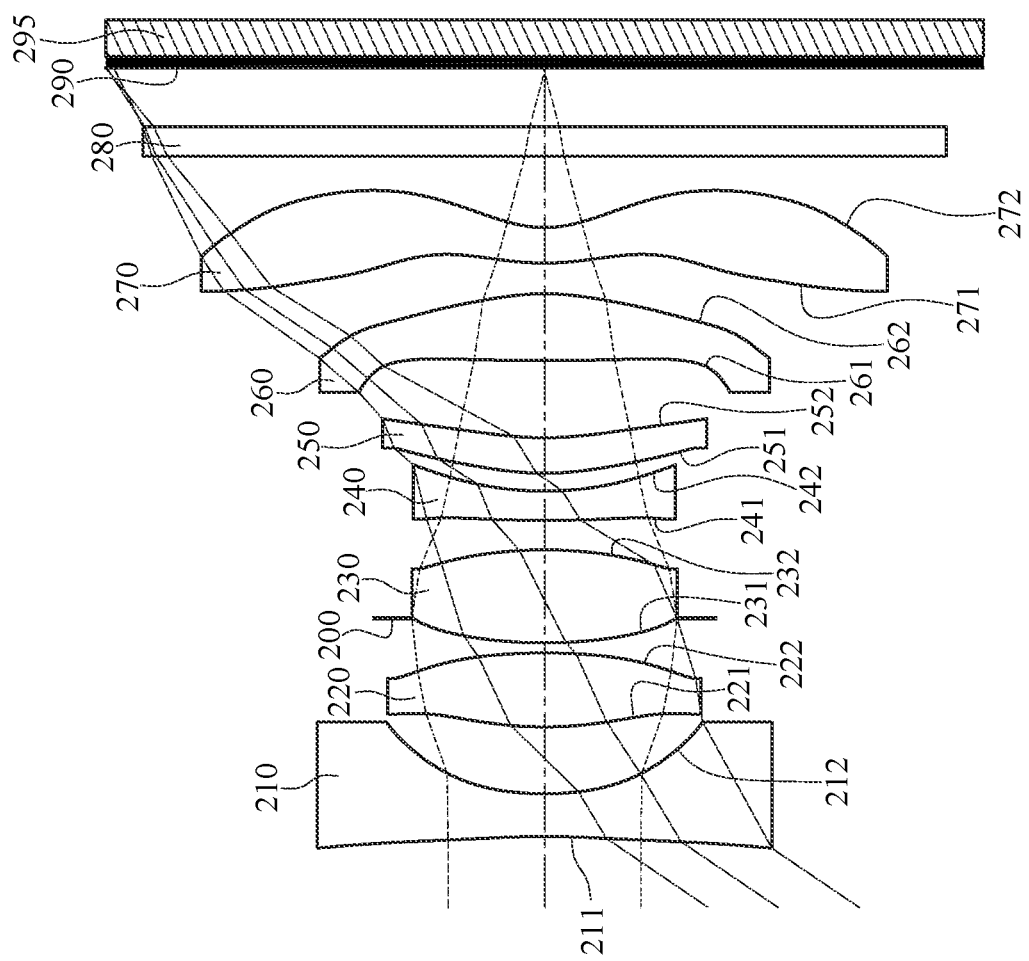
FIG. 3 is a schematic view of an image capturing unit according to the 2nd embodiment of the present disclosure.
Figure 4:
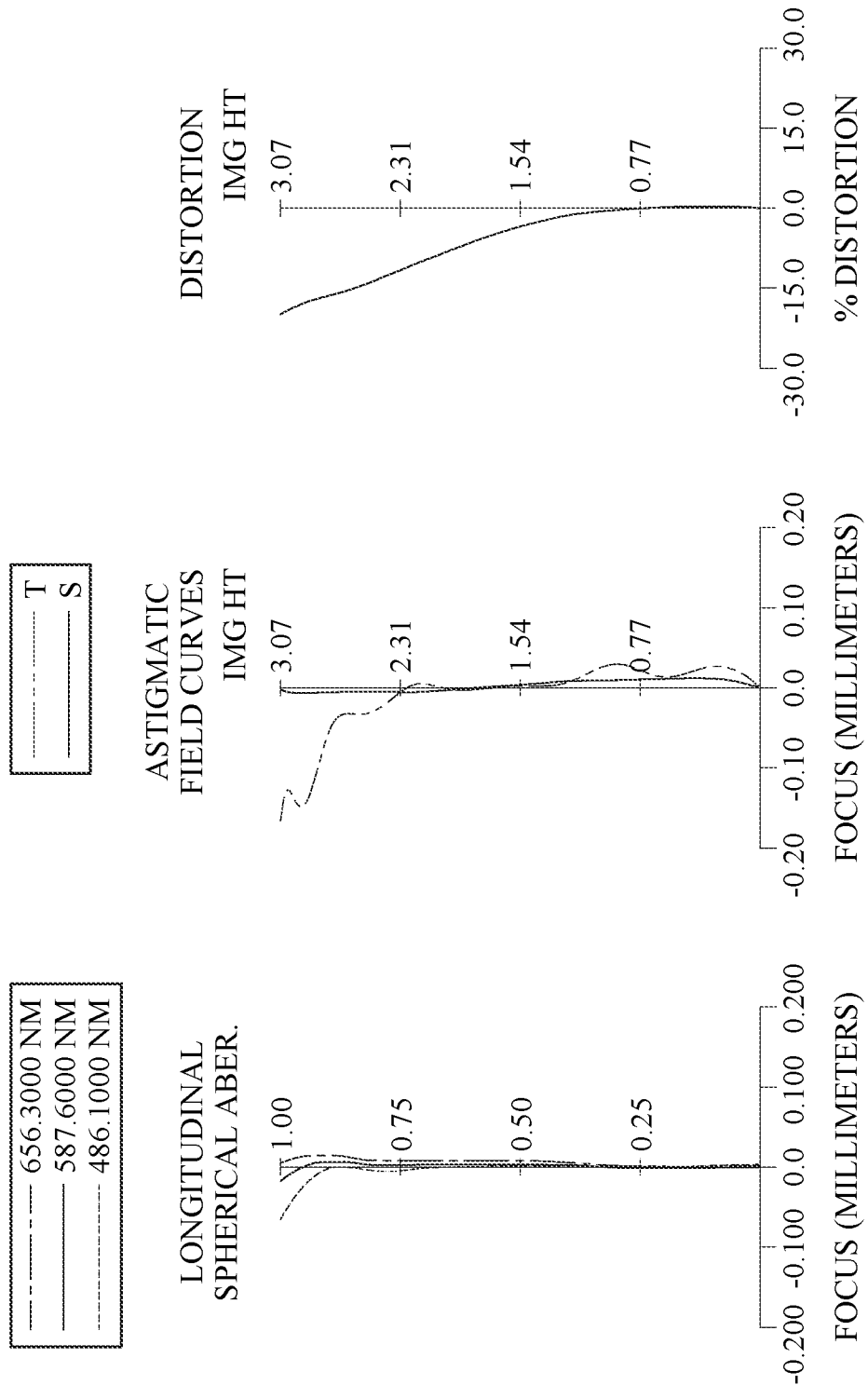
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 295. The photographing optical lens assembly includes, in order from an object side to an image side, a first lens element 210, a second lens element 220, an aperture stop 200, a third lens element 230, a fourth lens element 240, a fifth lens element 250, a sixth lens element 260, a seventh lens element 270, an IR-cut filter 280 and an image surface 290. The photographing optical lens assembly includes seven single and non-cemented lens elements (210, 220, 230, 240, 250, 260 and 270) with no additional lens element disposed between each of the adjacent seven lens elements, wherein there is an air gap between every adjacent lens element.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of glass material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The image-side surface 272 of the seventh lens element 270 has at least one critical point in an off-axis region thereof.

The IR-cut filter 280 is made of glass material and located between the seventh lens element 270 and the image surface 290, and will not affect the focal length of the photographing optical lens assembly. The image sensor 295 is disposed on or near the image surface 290 of the photographing optical lens assembly.

The detailed optical data of the 2nd embodiment are shown in Table 3 and the aspheric surface data are shown in Table 4 below.

TABLE 3

2nd Embodiment
f = 2.64 mm, Fno = 1.95, HFOV = 55.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −5.067 (ASP) | 0.300 | Plastic | 1.544 | 56.0 | −2.83 |
| 2 | | 2.260 (ASP) | 0.470 | | | | |
| 3 | Lens 2 | 2.641 (ASP) | 0.520 | Plastic | 1.544 | 56.0 | 3.10 |
| 4 | | −4.327 (ASP) | 0.242 | | | | |
| 5 | Ape. Stop | Plano | −0.171 | | | | |
| 6 | Lens 3 | 3.329 (ASP) | 0.654 | Glass | 1.542 | 62.9 | 3.01 |
| 7 | | −2.991 (ASP) | 0.208 | | | | |
| 8 | Lens 4 | 13.549 (ASP) | 0.205 | Plastic | 1.671 | 19.5 | −4.18 |
| 9 | | 2.307 (ASP) | 0.125 | | | | |
| 10 | Lens 5 | 1.787 (ASP) | 0.250 | Plastic | 1.544 | 56.0 | 14.97 |
| 11 | | 2.176 (ASP) | 0.545 | | | | |
| 12 | Lens 6 | 135.388 (ASP) | 0.468 | Plastic | 1.544 | 56.0 | 3.00 |
| 13 | | −1.648 (ASP) | 0.215 | | | | |
| 14 | Lens 7 | 1.632 (ASP) | 0.250 | Plastic | 1.543 | 45.6 | −2.95 |
| 15 | | 0.765 (ASP) | 0.500 | | | | |
| 16 | IR-cut filter | Plano | 0.210 | Glass | 1.517 | 64.2 | — |
| 17 | | Plano | 0.412 | | | | |
| 18 | Image | Plano | — | | | | |

Note:
Reference wavelength is 587.6 nm (d-line).
An effective radius of the image-side surface 262 (Surface 13) is 1.580 mm.

TABLE 4

| Aspheric Coefficients | | | | | |
|---|---|---|---|---|---|
| Surface # | 1 | 2 | 3 | 4 | 6 |
| k = | −2.0881E−01 | 2.4584E+00 | −2.9839E+00 | −5.6179E+01 | −1.0428E+01 |
| A4 = | 1.6364E−01 | 2.3028E−01 | −1.2195E−02 | −1.5035E−01 | 4.1409E−02 |
| A6 = | −2.2177E−01 | −2.7502E−01 | −4.5640E−02 | 2.6770E−01 | −6.0104E−03 |
| A8 = | 2.1815E−01 | 3.1575E−01 | −1.4706E−01 | −1.2492E+00 | 6.2745E−02 |
| A10 = | −1.6758E−01 | −4.2706E−01 | 2.7632E−01 | 3.9744E+00 | −2.1785E−02 |
| A12 = | 1.0211E−01 | 5.6626E−01 | −2.8373E−01 | −7.9112E+00 | 3.9062E−02 |
| A14 = | −4.7250E−02 | −5.6706E−01 | 9.1234E−02 | 9.8023E+00 | 6.9117E−02 |
| A16 = | 1.5038E−02 | 3.5759E−01 | 1.0204E−01 | −7.3024E+00 | −8.5625E−02 |
| A18 = | −2.8306E−03 | −1.3124E−01 | −8.0465E−02 | 2.9979E+00 | −1.1682E−01 |
| A20 = | 2.3242E−04 | 2.3008E−02 | 1.4414E−02 | −5.1806E−01 | 1.2808E−01 |
| Surface # | 7 | 8 | 9 | 10 | 11 |
| k = | 2.1571E+00 | 9.0000E+01 | 2.2854E+00 | −1.6536E+01 | −3.5985E+01 |
| A4 = | 2.7770E−02 | 1.2824E−01 | −2.5086E−02 | −6.4741E−02 | 1.3470E−01 |
| A6 = | −1.1757E−01 | −4.4973E−01 | 1.8988E−01 | 1.6141E−01 | −9.4720E−01 |
| A8 = | 1.0442E−01 | 4.6608E−01 | −9.1926E−01 | −2.1417E−01 | 3.3215E+00 |
| A10 = | 1.1243E−02 | −2.6446E−01 | 1.4580E+00 | 4.9751E−01 | −7.4773E+00 |
| A12 = | 5.0201E−02 | 3.5351E−02 | −3.4768E−01 | −1.3585E+00 | 1.1259E+01 |
| A14 = | 1.8291E−02 | 2.2404E−02 | −2.0909E+00 | 2.2334E+00 | −1.1217E+01 |
| A16 = | −1.3733E−01 | −3.2174E−02 | 3.1627E+00 | −2.0479E+00 | 7.0548E+00 |
| A18 = | −6.9919E−02 | −3.4001E−02 | −1.9345E+00 | 1.0032E+00 | −2.5197E+00 |
| A20 = | 1.7376E−01 | 2.9213E−02 | 4.5140E−01 | −2.0975E−01 | 3.8699E−01 |
| Surface # | 12 | 13 | 14 | 15 | |
| k = | −1.2276E+01 | −4.2620E+00 | −2.9626E+01 | −4.5274E+00 | |
| A4 = | 1.1007E−01 | 2.5273E−01 | 4.8795E−02 | −1.1709E−01 | |
| A6 = | −1.3173E−01 | −1.5376E−01 | −5.3151E−01 | −5.4822E−02 | |
| A8 = | −2.7053E−01 | −6.5970E−01 | 6.0419E−01 | 1.2568E−01 | |
| A10 = | 6.5165E−01 | 1.5257E+00 | −3.2604E−01 | −9.2618E−02 | |
| A12 = | −3.9074E−01 | −1.5023E+00 | 1.0064E−01 | 3.8877E−02 | |
| A14 = | −2.0846E−01 | 8.3357E−01 | −1.8593E−02 | −9.9787E−03 | |
| A16 = | 3.9069E−01 | −2.7449E−01 | 2.0116E−03 | 1.5372E−03 | |
| A18 = | −1.9341E−01 | 5.0606E−02 | −1.1531E−04 | −1.3003E−04 | |
| A20 = | 3.3591E−02 | −4.0427E−03 | 2.6037E−06 | 4.6316E−06 | |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again. Moreover, these parameters can be calculated from Table 3 and Table 4 as the following values and satisfy the following conditions:

| 2nd Embodiment | | | |
|---|---|---|---|
| f [mm] | 2.64 | |f4/f5| | 0.28 |
| Fno | 1.95 | |f6/f5| | 0.20 |
| HFOV [deg.] | 55.8 | |f7/f5| | 0.20 |
| FOV [deg.] | 111.6 | |f7/f1| | 1.04 |
| V2 | 56.0 | |f7/f2| | 0.95 |
| V6/V7 | 1.23 | |f7/f3| | 0.98 |
| CT2/(T12 + T23) | 0.96 | |f7/f4| | 0.71 |
| CT2/CT3 | 0.80 | |f7/f5| | 0.20 |
| ΣAT/(T12 + T56) | 1.61 | |f7/f6| | 0.99 |
| TL/ImgH | 1.76 | |f3/f2| | 0.97 |
| f/R1 | −0.52 | |f1/f2| | 0.91 |
| (R11 + R12)/(R11 − R12) | 0.98 | |f/f6| + |f/f7| | 1.78 |
| |f1/f5| | 0.19 | Y11/Y72 | 0.66 |
| |f2/f5| | 0.21 | Y72/f | 0.91 |
| |f3/f5| | 0.20 | — | — |

3rd Embodiment

Figure 5:
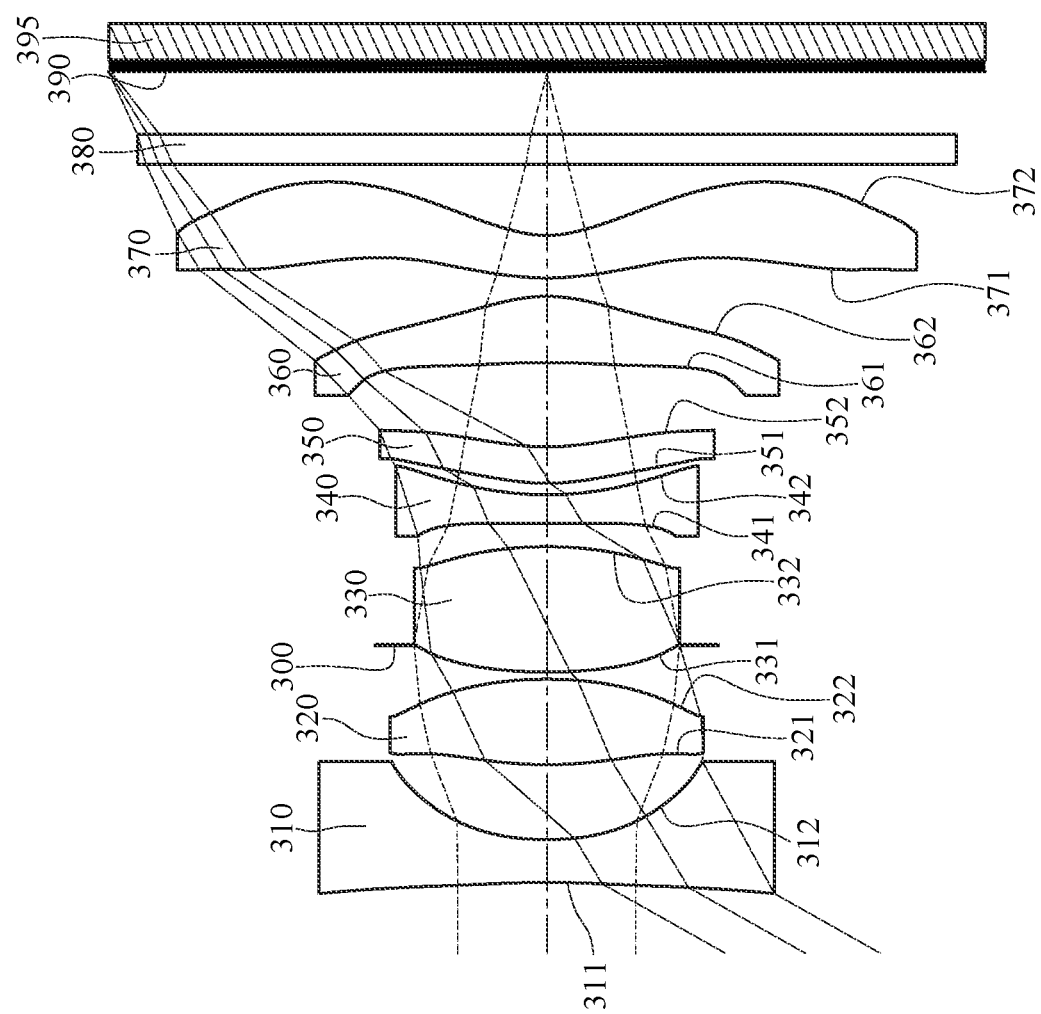
FIG. 5 is a schematic view of an image capturing unit according to the 3rd embodiment of the present disclosure.

FIG. 5 is a schematic view of an image capturing unit according to the 3rd embodiment of the present disclosure.

Figure 6:
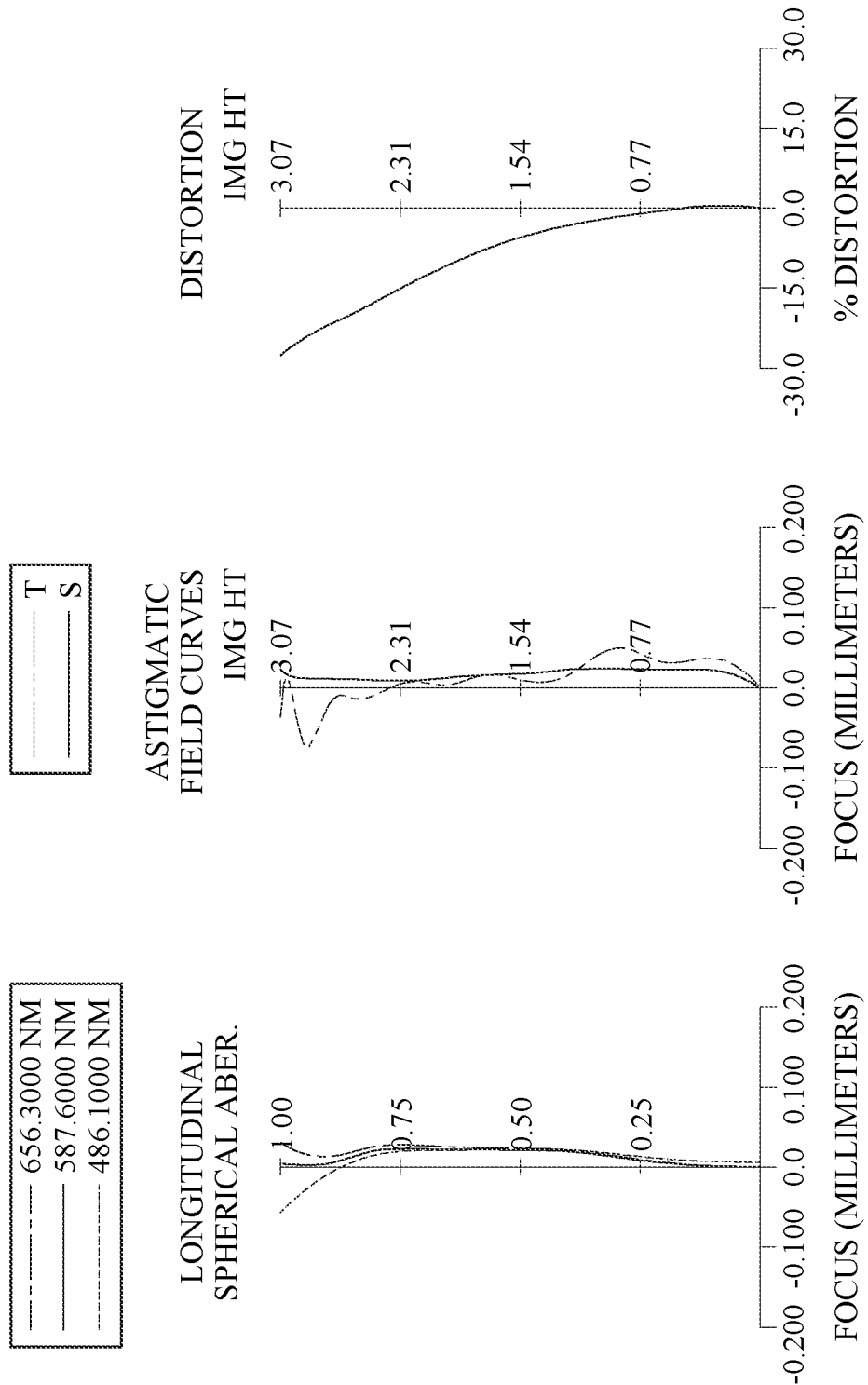
FIG. 6 shows spherical aberration curves, astigmatic field curves and a distortion curve of the image capturing unit according to the 3rd embodiment.

FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 395. The photographing optical lens assembly includes, in order from an object side to an image side, a first lens element 310, a second lens element 320, an aperture stop 300, a third lens element 330, a fourth lens element 340, a fifth lens element 350, a sixth lens element 360, a seventh lens element 370, an IR-cut filter 380 and an image surface 390. The photographing optical lens assembly includes seven single and non-cemented lens elements (310, 320, 330, 340, 350, 360 and 370) with no additional lens element disposed between each of the adjacent seven lens elements, wherein there is an air gap between every adjacent lens element.

The first lens element 310 with negative refractive power has an object-side surface 311 being concave in a paraxial region thereof and an image-side surface 312 being concave in a paraxial region thereof. The first lens element 310 is made of glass material and has the object-side surface 311 and the image-side surface 312 being both aspheric.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with positive refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The image-side surface 372 of the seventh lens element 370 has at least one critical point in an off-axis region thereof.

The IR-cut filter 380 is made of glass material and located between the seventh lens element 370 and the image surface 390, and will not affect the focal length of the photographing optical lens assembly. The image sensor 395 is disposed on or near the image surface 390 of the photographing optical lens assembly.

The detailed optical data of the 3rd embodiment are shown in Table 5 and the aspheric surface data are shown in Table 6 below.

TABLE 5

3rd Embodiment
f = 2.44 mm, Fno = 1.95, HFOV = 60.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −5.420 (ASP) | 0.300 | Glass | 1.618 | 47.8 | −2.33 |
| 2 | | 2.001 (ASP) | 0.527 | | | | |
| 3 | Lens 2 | 2.827 (ASP) | 0.601 | Plastic | 1.550 | 51.0 | 2.67 |
| 4 | | −2.815 (ASP) | 0.242 | | | | |
| 5 | Ape. Stop | Plano | −0.192 | | | | |
| 6 | Lens 3 | 3.288 (ASP) | 0.882 | Plastic | 1.544 | 56.0 | 2.93 |
| 7 | | −2.804 (ASP) | 0.165 | | | | |
| 8 | Lens 4 | −195.261 (ASP) | 0.200 | Plastic | 1.671 | 19.5 | −3.43 |
| 9 | | 2.328 (ASP) | 0.081 | | | | |
| 10 | Lens 5 | 1.504 (ASP) | 0.256 | Plastic | 1.544 | 56.0 | 14.27 |
| 11 | | 1.753 (ASP) | 0.593 | | | | |
| 12 | Lens 6 | −5.292 (ASP) | 0.465 | Plastic | 1.544 | 56.0 | 2.43 |
| 13 | | −1.090 (ASP) | 0.129 | | | | |
| 14 | Lens 7 | 1.682 (ASP) | 0.300 | Plastic | 1.586 | 32.6 | −2.62 |
| 15 | | 0.750 (ASP) | 0.500 | | | | |
| 16 | IR-cut filter | Plano | 0.210 | Glass | 1.517 | 64.2 | — |
| 17 | | Plano | 0.441 | | | | |
| 18 | Image | Plano | — | | | | |

Note:
Reference wavelength is 587.6 nm (d-line).
An effective radius of the image-side surface 362 (Surface 13) is 1.630 mm.

TABLE 6

Aspheric Coefficients

| Surface # | 1 | 2 | 3 | 4 | 6 |
|---|---|---|---|---|---|
| k = | 1.6033E+00 | 1.7932E+00 | −3.7535E+00 | −9.1121E+00 | −1.5691E+01 |
| A4 = | 1.6159E−01 | 2.2485E−01 | −3.4225E−02 | −1.3263E−01 | 5.7773E−02 |
| A6 = | −2.2159E−01 | −2.8084E−01 | −5.4552E−02 | 2.7694E−01 | 8.5202E−02 |
| A8 = | 2.1834E−01 | 2.9944E−01 | −1.1318E−01 | −1.2598E+00 | −3.9560E−03 |
| A10 = | −1.6752E−01 | −3.9361E−01 | 2.8565E−01 | 3.9676E+00 | −1.0121E−01 |
| A12 = | 1.0210E−01 | 5.7495E−01 | −2.9430E−01 | −7.9093E+00 | 1.2516E−01 |
| A14 = | −4.7255E−02 | −5.8124E−01 | 7.8978E−02 | 9.8025E+00 | 6.2228E−02 |
| A16 = | 1.5037E−02 | 3.4015E−01 | 9.7873E−02 | −7.3063E+00 | −1.5137E−02 |
| A18 = | −2.8305E−03 | −1.3415E−01 | −7.8870E−02 | 2.9940E+00 | −2.5092E−01 |
| A20 = | 2.3258E−04 | 4.0058E−02 | 2.2326E−02 | −5.1414E−01 | 1.7671E−01 |

TABLE 6-continued

| Aspheric Coefficients | | | | | |
|---|---|---|---|---|---|
| Surface # | 7 | 8 | 9 | 10 | 11 |
| k = | 3.2533E+00 | −8.6146E+01 | 1.5577E+00 | −1.3459E+01 | −2.1903E+01 |
| A4 = | −2.9410E−02 | 7.5533E−02 | −5.6010E−02 | −1.0426E−01 | 1.1893E−01 |
| A6 = | −4.2980E−02 | −5.5001E−01 | 2.2246E−01 | 1.5596E−01 | −9.8028E−01 |
| A8 = | 2.4404E−01 | 7.2858E−01 | −9.0211E−01 | −1.9473E−01 | 3.3347E+00 |
| A10 = | −1.7086E−01 | −2.9775E−01 | 1.4651E+00 | 5.0100E−01 | −7.4684E+00 |
| A12 = | −1.5304E−01 | −2.7654E−01 | −3.8857E−01 | −1.3659E+00 | 1.1254E+01 |
| A14 = | 3.1375E−01 | −9.5771E−02 | −2.1356E+00 | 2.2265E+00 | −1.1223E+01 |
| A16 = | 1.2962E−01 | 2.1009E−01 | 3.2013E+00 | −2.0451E+00 | 7.0564E+00 |
| A18 = | −5.3282E−01 | 4.1530E−01 | −1.8636E+00 | 1.0069E+00 | −2.5203E+00 |
| A20 = | 3.0617E−01 | −4.2297E−01 | 4.0007E−01 | −2.1054E−01 | 3.8878E−01 |

| Surface # | 12 | 13 | 14 | 15 |
|---|---|---|---|---|
| k = | −9.0000E+01 | −4.3489E+00 | −4.6587E+01 | −6.3353E+00 |
| A4 = | 6.9282E−02 | 1.0468E−01 | 1.8296E−01 | 2.8597E−02 |
| A6 = | −6.7644E−02 | 4.2365E−01 | −2.9871E−01 | −1.0080E−01 |
| A8 = | 4.4990E−01 | −1.2915E+00 | 1.9126E−01 | 8.0033E−02 |
| A10 = | −1.6654E+00 | 1.6339E+00 | −6.6507E−02 | −3.9102E−02 |
| A12 = | 2.8153E+00 | −1.1693E+00 | 1.3173E−02 | 1.2760E−02 |
| A14 = | −2.6100E+00 | 5.0436E−01 | −1.3639E−03 | −2.7411E−03 |
| A16 = | 1.3776E+00 | −1.3053E−01 | 4.2788E−05 | 3.6667E−04 |
| A18 = | −3.9049E−01 | 1.8813E−02 | 3.8006E−06 | −2.7389E−05 |
| A20 = | 4.6267E−02 | −1.1717E−03 | −2.6491E−07 | 8.6650E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.44 | |f4/|f5| | 0.24 |
| Fno | 1.95 | |f6/|f5| | 0.17 |
| HFOV [deg.] | 60.6 | |f7/|f5| | 0.18 |
| FOV [deg.] | 121.2 | |f7/f1| | 1.12 |
| V2 | 51.0 | |f7/f2| | 0.98 |
| V6/V7 | 1.72 | |f7/f3| | 0.89 |
| CT2/(T12 + T23) | 1.04 | |f7/f4| | 0.76 |
| CT2/CT3 | 0.68 | |f7/f5| | 0.18 |
| ΣAT/(T12 + T56) | 1.38 | |f7/f6| | 1.08 |
| TL/ImgH | 1.85 | |f3/f2| | 1.10 |
| f/R1 | −0.45 | |f1/f2| | 0.87 |
| (R11 + R12)/(R11 − R12) | 1.52 | |f/f6| + |f/f7| | 1.94 |
| |f1/f5| | 0.16 | Y11/Y72 | 0.54 |
| |f2/f5| | 0.19 | Y72/f | 1.06 |
| |f3/f5| | 0.21 | — | — |

4th Embodiment

Figure 7:
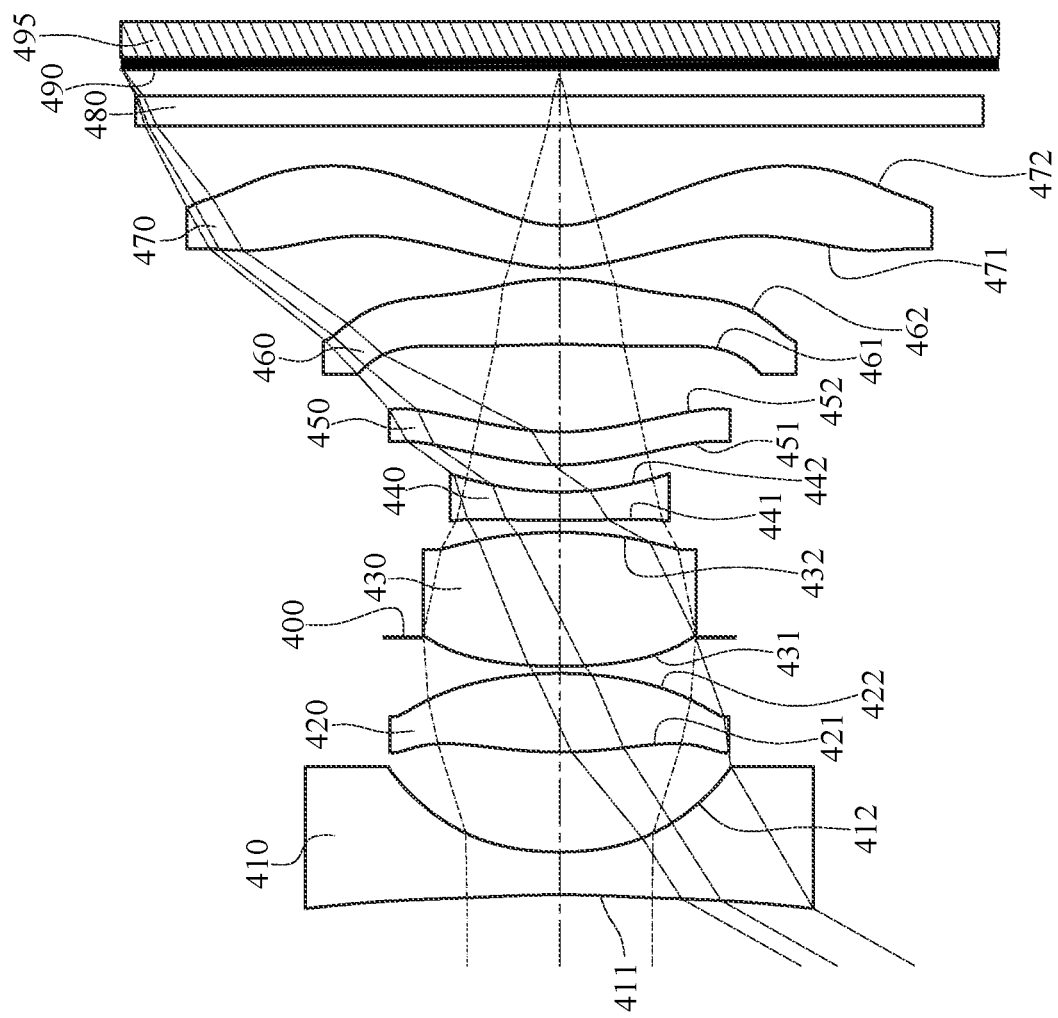
FIG. 7 is a schematic view of an image capturing unit according to the 4th embodiment of the present disclosure.
Figure 8:
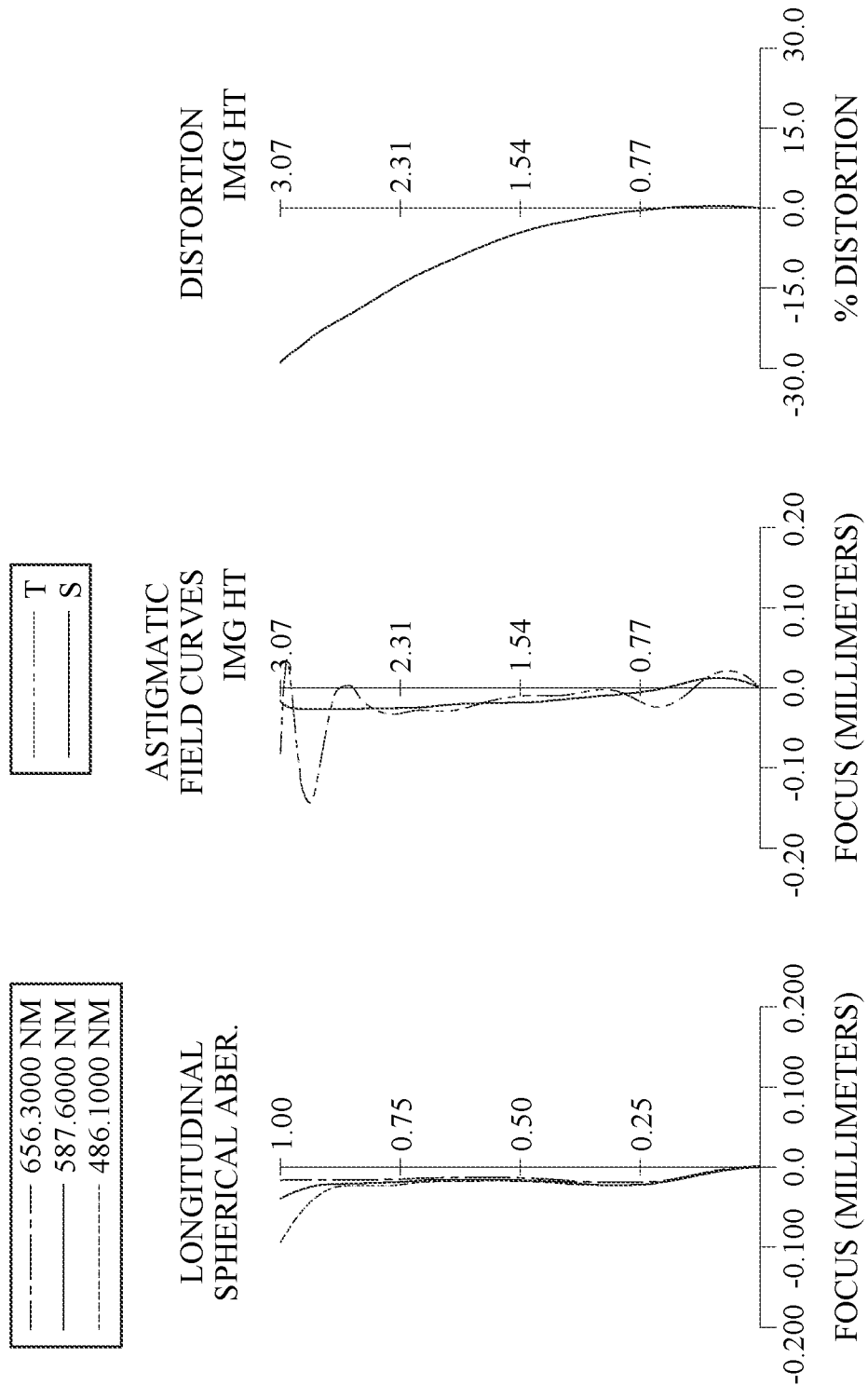
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 495. The photographing optical lens assembly includes, in order from an object side to an image side, a first lens element 410, a second lens element 420, an aperture stop 400, a third lens element 430, a fourth lens element 440, a fifth lens element 450, a sixth lens element 460, a seventh lens element 470, an IR-cut filter 480 and an image surface 490. The photographing optical lens assembly includes seven single and non-cemented lens elements (410, 420, 430, 440, 450, 460 and 470) with no additional lens element disposed between each of the adjacent seven lens elements, wherein there is an air gap between every adjacent lens element.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The image-side surface 472 of the seventh lens element 470 has at least one critical point in an off-axis region thereof.

The IR-cut filter 480 is made of glass material and located between the seventh lens element 470 and the image surface 490, and will not affect the focal length of the photographing optical lens assembly. The image sensor 495 is disposed on or near the image surface 490 of the photographing optical lens assembly.

The detailed optical data of the 4th embodiment are shown in Table 7 and the aspheric surface data are shown in Table 8 below.

TABLE 7

4th Embodiment
f = 2.50 mm, Fno = 1.92, HFOV = 60.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −5.657 (ASP) | 0.300 | Plastic | 1.544 | 55.9 | −2.78 |
| 2 | | 2.105 (ASP) | 0.703 | | | | |
| 3 | Lens 2 | 3.072 (ASP) | 0.553 | Plastic | 1.544 | 55.9 | 2.78 |
| 4 | | −2.788 (ASP) | 0.252 | | | | |
| 5 | Ape. Stop | Plano | −0.202 | | | | |
| 6 | Lens 3 | 3.575 (ASP) | 0.942 | Plastic | 1.544 | 55.9 | 3.11 |
| 7 | | −2.917 (ASP) | 0.084 | | | | |
| 8 | Lens 4 | 17.466 (ASP) | 0.200 | Plastic | 1.688 | 18.7 | −3.97 |
| 9 | | 2.348 (ASP) | 0.191 | | | | |
| 10 | Lens 5 | 1.741 (ASP) | 0.231 | Plastic | 1.544 | 55.9 | 36.96 |
| 11 | | 1.817 (ASP) | 0.616 | | | | |
| 12 | Lens 6 | −6.040 (ASP) | 0.461 | Plastic | 1.544 | 55.9 | 3.69 |
| 13 | | −1.547 (ASP) | 0.074 | | | | |
| 14 | Lens 7 | 1.173 (ASP) | 0.300 | Plastic | 1.584 | 28.2 | −4.06 |
| 15 | | 0.711 (ASP) | 0.700 | | | | |
| 16 | IR-cut filter | Plano | 0.210 | Glass | 1.517 | 64.2 | — |
| 17 | | Plano | 0.187 | | | | |
| 18 | Image | Plano | — | | | | |

Note:
Reference wavelength is 587.6 nm (d-line).
An effective radius of the image-side surface 462 (Surface 13) is 1.660 mm.

TABLE 8

Aspheric Coefficients

| Surface # | 1 | 2 | 3 | 4 | 6 |
|---|---|---|---|---|---|
| k = | 1.9159E+00 | 5.2724E−01 | −1.3612E+01 | −1.1853E+01 | −8.4282E+00 |
| A4 = | 1.5313E−01 | 1.8085E−01 | −1.3539E−02 | −7.7504E−02 | 1.3023E−01 |
| A6 = | −2.1348E−01 | −2.7079E−02 | −1.3595E−01 | −1.2662E−01 | −4.7274E−01 |
| A8 = | 2.1787E−01 | −4.9221E−01 | 1.5878E−01 | 6.3106E−01 | 3.1661E+00 |
| A10 = | −1.6418E−01 | 1.1434E+00 | −9.7326E−02 | −1.8188E+00 | −1.2272E+01 |
| A12 = | 8.7962E−02 | −9.5274E−01 | −4.9607E−01 | 3.2956E+00 | 3.0321E+01 |
| A14 = | −3.2125E−02 | −1.7616E−01 | 1.3616E+00 | −3.7812E+00 | −4.7259E+01 |
| A16 = | 7.5524E−03 | 8.8221E−01 | −1.4654E+00 | 2.6726E+00 | 4.4920E+01 |
| A18 = | −1.0251E−03 | −5.8621E−01 | 7.3879E−01 | −1.0673E+00 | −2.3759E+01 |
| A20 = | 6.0773E−05 | 1.3016E−01 | −1.4233E−01 | 1.8627E−01 | 5.3585E+00 |

| Surface # | 7 | 8 | 9 | 10 | 11 |
|---|---|---|---|---|---|
| k = | 1.7175E+00 | −9.0000E+01 | 2.2598E+00 | −8.3618E+00 | −1.3842E+01 |
| A4 = | 1.5733E−01 | 2.7451E−01 | 1.2377E−01 | −3.9390E−02 | 6.1853E−02 |
| A6 = | −1.3014E+00 | −2.3628E+00 | −9.3322E−01 | 5.5998E−03 | −2.2279E−01 |
| A8 = | 5.9751E+00 | 1.0548E+01 | 2.9063E+00 | −3.2031E−01 | 2.4145E−01 |
| A10 = | −1.9551E+01 | −3.5802E+01 | −6.3501E+00 | 1.6772E+00 | 4.6121E−02 |
| A12 = | 4.6740E+01 | 8.6605E+01 | 9.9763E+00 | −4.0166E+00 | −4.8305E−01 |
| A14 = | −7.6709E+01 | −1.4028E+02 | −1.0960E+01 | 5.4124E+00 | 6.3398E−01 |
| A16 = | 8.0317E+01 | 1.4255E+02 | 7.9499E+00 | −4.2620E+00 | −4.2027E−01 |
| A18 = | −4.7797E+01 | −8.1778E+01 | −3.4358E+00 | 1.8384E+00 | 1.4772E−01 |
| A20 = | 1.2237E+01 | 2.0111E+01 | 6.7058E−01 | −3.3697E−01 | −2.2124E−02 |

TABLE 8-continued

Aspheric Coefficients

| Surface # | 12 | 13 | 14 | 15 |
|---|---|---|---|---|
| k = | −9.0000E+01 | −6.1118E+00 | −1.5157E+01 | −5.1449E+00 |
| A4 = | 1.6243E−01 | 5.5570E−02 | −1.3110E−02 | −7.1062E−02 |
| A6 = | −4.3513E−01 | 3.9586E−01 | 4.7378E−02 | 5.5386E−02 |
| A8 = | 1.3246E+00 | −7.7808E−01 | −7.6795E−02 | −3.2421E−02 |
| A10 = | −2.6589E+00 | 7.1068E−01 | 4.8410E−02 | 7.7549E−03 |
| A12 = | 3.1495E+00 | −4.0754E−01 | −1.6716E−02 | 4.2446E−04 |
| A14 = | −2.2753E+00 | 1.5658E−01 | 3.4614E−03 | −6.2763E−04 |
| A16 = | 9.8919E−01 | −4.0172E−02 | −4.2752E−04 | 1.3518E−04 |
| A18 = | −2.3832E−01 | 6.3162E−03 | 2.8958E−05 | −1.2543E−05 |
| A20 = | 2.4478E−02 | −4.5550E−04 | −8.2609E−07 | 4.4171E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.50 | |f4/|f5|| | 0.11 |
| Fno | 1.92 | |f6/|f5|| | 0.10 |
| HFOV [deg.] | 60.6 | |f7/|f5|| | 0.11 |
| FOV [deg.] | 121.2 | |f7/f1| | 1.46 |
| V2 | 55.9 | |f7/f2| | 1.46 |
| V6/V7 | 1.98 | |f7/f3| | 1.30 |
| CT2/(T12 + T23) | 0.73 | |f7/f4| | 1.02 |
| CT2/CT3 | 0.59 | |f7/f5| | 0.11 |
| ΣAT/(T12 + T56) | 1.30 | |f7/f6| | 1.10 |
| TL/ImgH | 1.89 | |f3/f2| | 1.12 |
| f/R1 | −0.44 | |f1/f2| | 1.00 |
| (R11 + R12)/(R11 − R12) | 1.69 | |f/f6| + |f/f7| | 1.29 |
| |f1/|f5|| | 0.08 | Y11/Y72 | 0.68 |
| |f2/|f5|| | 0.08 | Y72/f | 1.05 |
| |f3/|f5|| | 0.08 | — | — |

5th Embodiment

Figure 9:
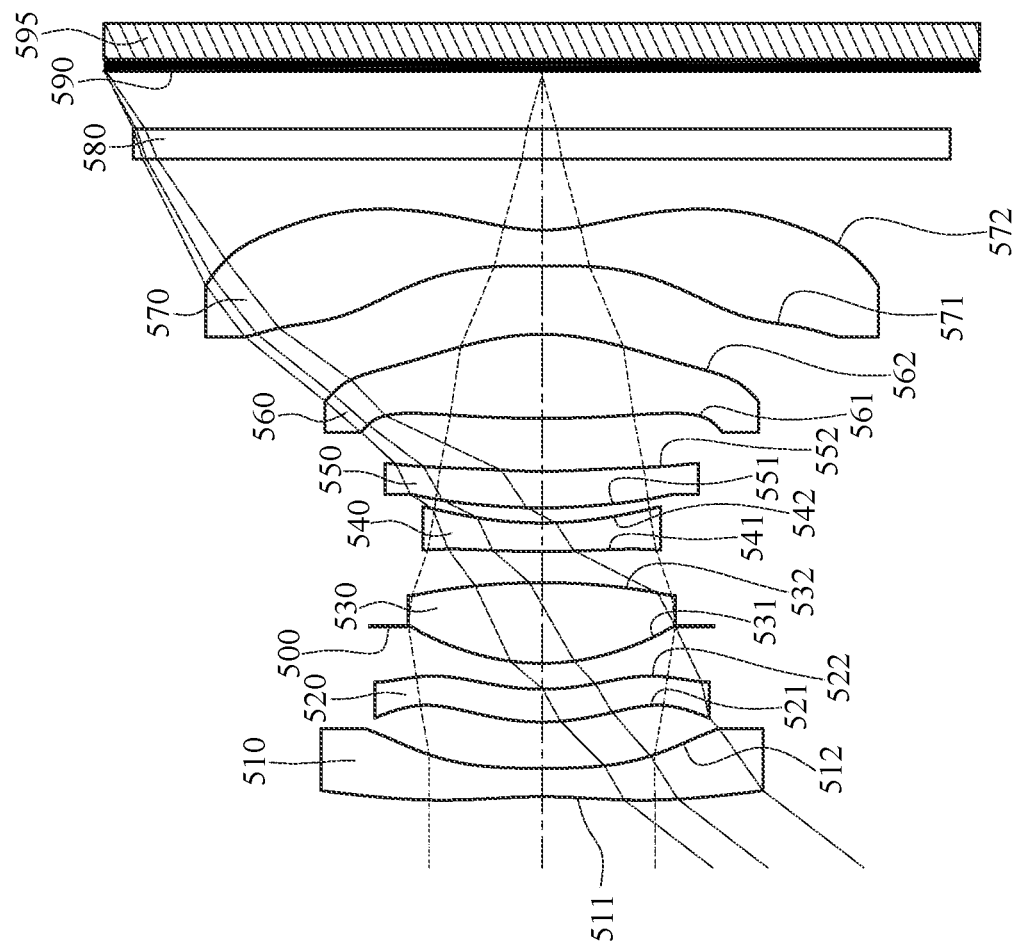
FIG. 9 is a schematic view of an image capturing unit according to the 5th embodiment of the present disclosure.
Figure 10:
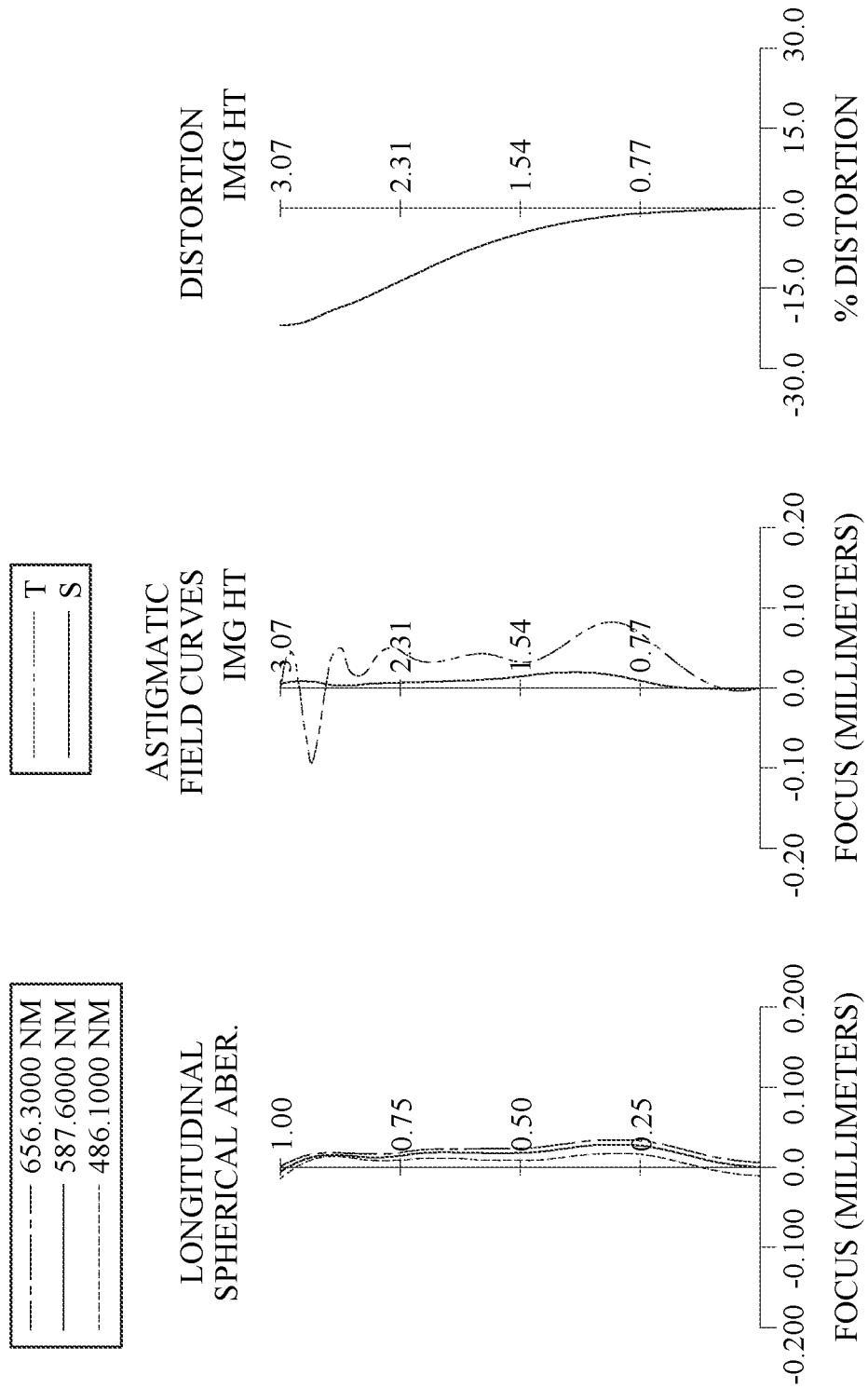
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 595. The photographing optical lens assembly includes, in order from an object side to an image side, a first lens element 510, a second lens element 520, an aperture stop 500, a third lens element 530, a fourth lens element 540, a fifth lens element 550, a sixth lens element 560, a seventh lens element 570, an IR-cut filter 580 and an image surface 590. The photographing optical lens assembly includes seven single and non-cemented lens elements (510, 520, 530, 540, 550, 560 and 570) with no additional lens element disposed between each of the adjacent seven lens elements, wherein there is an air gap between every adjacent lens element.

The first lens element 510 with negative refractive power has an object-side surface 511 being concave in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric.

The seventh lens element 570 with negative refractive power has an object-side surface 571 being concave in a paraxial region thereof and an image-side surface 572 being concave in a paraxial region thereof. The seventh lens element 570 is made of plastic material and has the object-side surface 571 and the image-side surface 572 being both aspheric. The image-side surface 572 of the seventh lens element 570 has at least one critical point in an off-axis region thereof.

The IR-cut filter 580 is made of glass material and located between the seventh lens element 570 and the image surface 590, and will not affect the focal length of the photographing optical lens assembly. The image sensor 595 is disposed on or near the image surface 590 of the photographing optical lens assembly.

The detailed optical data of the 5th embodiment are shown in Table 9 and the aspheric surface data are shown in Table 10 below.

TABLE 9

5th Embodiment
f = 3.06 mm, Fno = 1.93, HFOV = 52.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.818 (ASP) | 0.200 | Plastic | 1.544 | 56.0 | −5.23 |
| 2 | | 11.397 (ASP) | 0.325 | | | | |
| 3 | Lens 2 | 1.559 (ASP) | 0.231 | Plastic | 1.559 | 40.4 | 30.39 |
| 4 | | 1.626 (ASP) | 0.442 | | | | |
| 5 | Ape. Stop | Plano | −0.260 | | | | |
| 6 | Lens 3 | 1.634 (ASP) | 0.568 | Plastic | 1.544 | 56.0 | 2.26 |
| 7 | | −4.340 (ASP) | 0.219 | | | | |
| 8 | Lens 4 | 8.925 (ASP) | 0.200 | Plastic | 1.688 | 18.7 | −6.26 |
| 9 | | 2.877 (ASP) | 0.106 | | | | |
| 10 | Lens 5 | 3.651 (ASP) | 0.257 | Plastic | 1.544 | 55.9 | 32.93 |
| 11 | | 4.471 (ASP) | 0.372 | | | | |
| 12 | Lens 6 | 8.057 (ASP) | 0.592 | Plastic | 1.544 | 56.0 | 2.49 |
| 13 | | −1.588 (ASP) | 0.482 | | | | |
| 14 | Lens 7 | −22.412 (ASP) | 0.250 | Plastic | 1.543 | 54.1 | −2.19 |
| 15 | | 1.257 (ASP) | 0.500 | | | | |
| 16 | IR-cut filter | Plano | 0.210 | Glass | 1.517 | 64.2 | — |
| 17 | | Plano | 0.407 | | | | |
| 18 | Image | Plano | — | | | | |

Note:
Reference wavelength is 587.6 nm (d-line).
An effective radius of the image-side surface 552 (Surface 11) is 1.100 mm.
An effective radius of the object-side surface 561 (Surface 12) is 1.270 mm.

TABLE 10

Aspheric Coefficients

| Surface # | 1 | 2 | 3 | 4 | 6 |
|---|---|---|---|---|---|
| k = | −6.8681E+01 | 7.4045E+01 | −1.1357E+01 | −1.6729E+01 | −3.1958E+00 |
| A4 = | 1.2862E−01 | 3.0059E−01 | 1.7127E−01 | 2.4618E−01 | 6.3216E−02 |
| A6 = | −8.5759E−02 | −4.2483E−01 | −5.2414E−01 | −1.3140E+00 | −4.3647E−02 |
| A8 = | −9.0010E−03 | 8.2064E−01 | 1.2470E−01 | 3.1690E+00 | −9.4229E−03 |
| A10 = | 7.2104E−02 | −1.6327E+00 | 1.2955E+00 | −6.6213E+00 | 1.1513E−02 |
| A12 = | −6.6657E−02 | 2.3406E+00 | −3.7282E+00 | 1.0090E+01 | 5.4376E−02 |
| A14 = | 3.0860E−02 | −2.1698E+00 | 5.0467E+00 | −1.0008E+01 | 3.7503E−02 |
| A16 = | −7.5155E−03 | 1.2166E+00 | −3.6316E+00 | 6.1458E+00 | −3.0637E−02 |
| A18 = | 8.0322E−04 | −3.7435E−01 | 1.3445E+00 | −2.1190E+00 | −6.7882E−02 |
| A20 = | −1.2514E−05 | 4.8554E−02 | −2.0327E−01 | 3.1072E−01 | 3.6305E−02 |

| Surface # | 7 | 8 | 9 | 10 | 11 |
|---|---|---|---|---|---|
| k = | −1.1996E+01 | −9.0000E+01 | 1.9530E+00 | −2.9442E+01 | −9.0000E+01 |
| A4 = | 2.8878E−02 | 8.2529E−02 | 6.3938E−02 | −1.3415E−01 | −6.6622E−02 |
| A6 = | −9.2554E−02 | −4.3178E−01 | −3.9563E−01 | 8.9091E−01 | −1.7301E−01 |
| A8 = | 6.3422E−02 | 4.9482E−01 | 1.5056E+00 | −4.3437E+00 | 1.4324E+00 |
| A10 = | −1.5137E−02 | −2.8897E−01 | −5.9975E+00 | 1.6025E+01 | −5.0130E+00 |
| A12 = | −1.6485E−02 | 6.2298E−02 | 1.5952E+01 | −3.8508E+01 | 1.0880E+01 |
| A14 = | 2.1950E−02 | 7.4650E−02 | −2.5903E+01 | 5.8290E+01 | −1.4565E+01 |
| A16 = | 3.2680E−02 | 2.2762E−02 | 2.5085E+01 | −5.3847E+01 | 1.1630E+01 |
| A18 = | 1.8564E−02 | −1.0920E−02 | −1.3254E+01 | 2.7792E+01 | −5.0692E+00 |
| A20 = | −6.0022E−02 | −1.0845E−01 | 2.9037E+00 | −6.1571E+00 | 9.2562E−01 |

| Surface # | 12 | 13 | 14 | 15 |
|---|---|---|---|---|
| k = | −2.2622E+01 | −1.9292E+00 | 8.9999E+01 | −7.7140E+00 |
| A4 = | 3.4111E−02 | 1.2596E−01 | −3.5299E−01 | −1.9830E−01 |
| A6 = | −2.8689E−01 | −5.6882E−02 | 3.7635E−01 | 1.8759E−01 |
| A8 = | 1.1812E+00 | −1.0559E−01 | −2.9849E−01 | −1.3784E−01 |
| A10 = | −3.1612E+00 | 3.6041E−01 | 1.7315E−01 | 7.1271E−02 |
| A12 = | 5.2218E+00 | −4.7335E−01 | −6.3174E−02 | −2.5305E−02 |

TABLE 10-continued

| Aspheric Coefficients | | | | |
|---|---|---|---|---|
| A14 = | −5.3725E+00 | 3.3575E−01 | 1.3703E−02 | 5.9463E−03 |
| A16 = | 3.3392E+00 | −1.3334E−01 | −1.6862E−03 | −8.6788E−04 |
| A18 = | −1.1456E+00 | 2.7311E−02 | 1.0520E−04 | 7.0201E−05 |
| A20 = | 1.6579E−01 | −2.1930E−03 | −2.3888E−06 | −2.3807E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.06 | $|f4/f5|$ | 0.19 |
| Fno | 1.93 | $|f6/f5|$ | 0.08 |
| HFOV [deg.] | 52.5 | $|f7/f5|$ | 0.07 |
| FOV [deg.] | 105.0 | $|f7/f1|$ | 0.42 |
| V2 | 40.4 | $|f7/f2|$ | 0.07 |
| V6/V7 | 1.04 | $|f7/f3|$ | 0.97 |
| CT2/(T12 + T23) | 0.46 | $|f7/f4|$ | 0.35 |
| CT2/CT3 | 0.41 | $|f7/f5|$ | 0.07 |
| ΣAT/(T12 + T56) | 2.42 | $|f7/f6|$ | 0.88 |
| TL/ImgH | 1.66 | $|f3/f2|$ | 0.07 |
| f/R1 | −0.80 | $|f1/f2|$ | 0.17 |
| (R11 + R12)/(R11 − R12) | 0.67 | $|f/f6| + |f/f7|$ | 2.63 |
| $|f1/f5|$ | 0.16 | Y11/Y72 | 0.65 |
| $|f2/f5|$ | 0.92 | Y72/f | 0.77 |
| $|f3/f5|$ | 0.07 | — | — |

6th Embodiment

Figure 11:
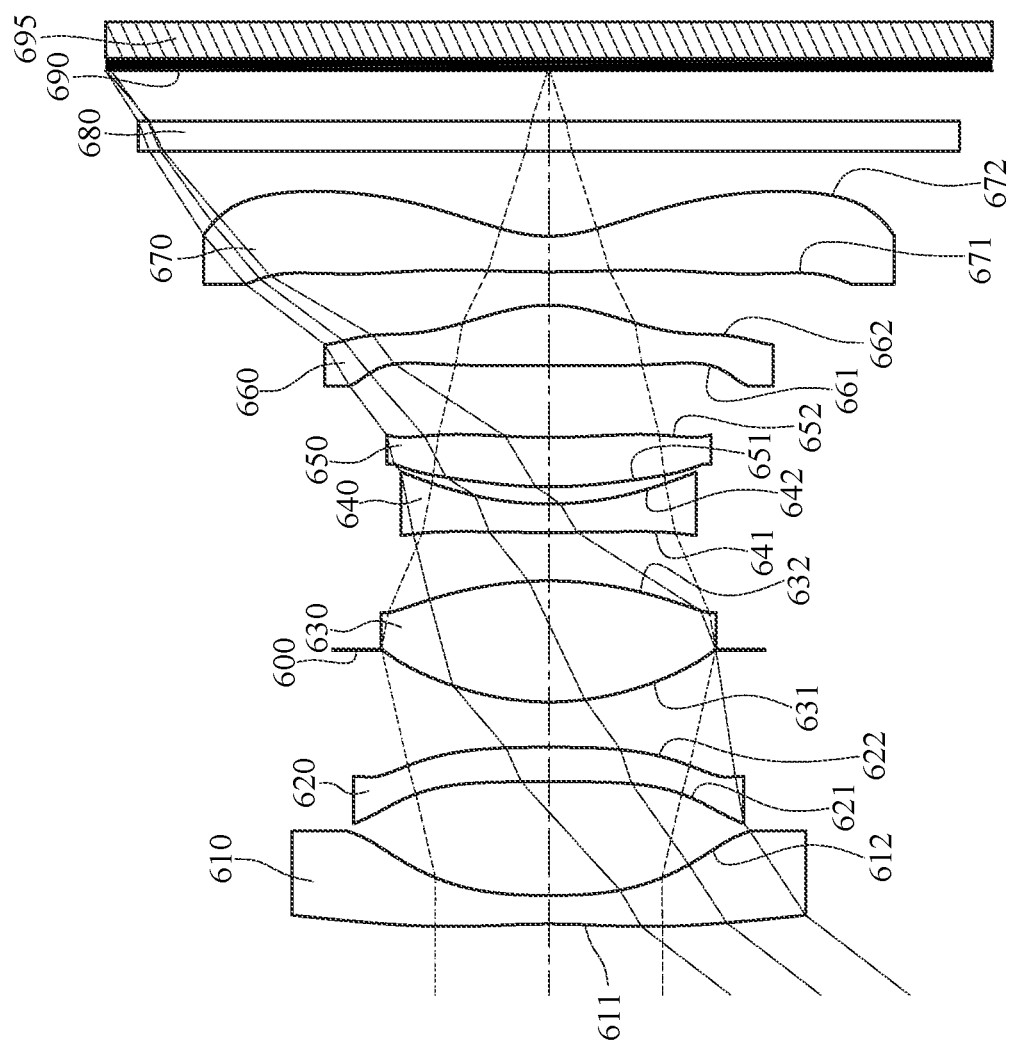
FIG. 11 is a schematic view of an image capturing unit according to the 6th embodiment of the present disclosure.
Figure 12:
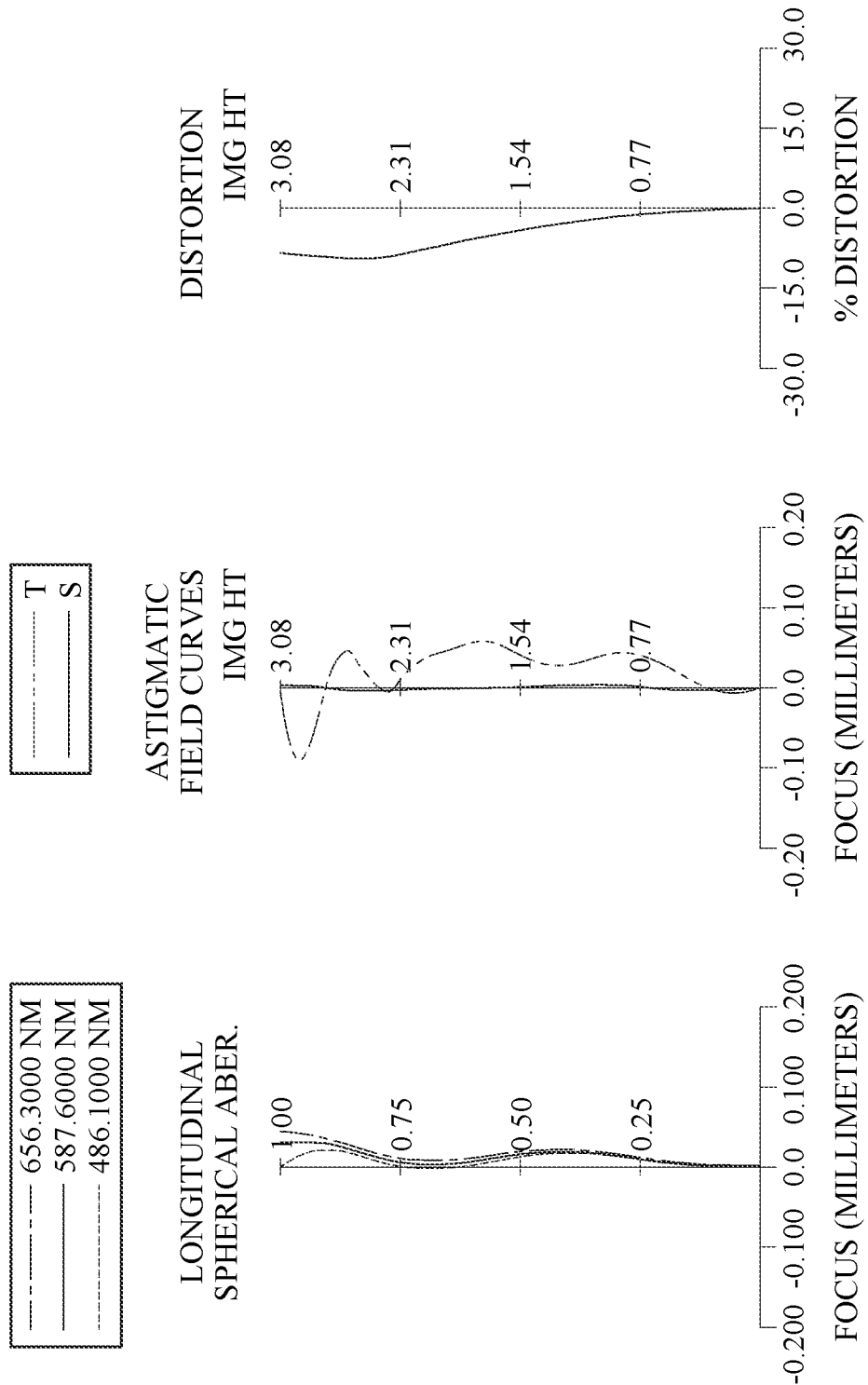
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 695. The photographing optical lens assembly includes, in order from an object side to an image side, a first lens element 610, a second lens element 620, an aperture stop 600, a third lens element 630, a fourth lens element 640, a fifth lens element 650, a sixth lens element 660, a seventh lens element 670, an IR-cut filter 680 and an image surface 690. The photographing optical lens assembly includes seven single and non-cemented lens elements (610, 620, 630, 640, 650, 660 and 670) with no additional lens element disposed between each of the adjacent seven lens elements, wherein there is an air gap between every adjacent lens element.

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being planar in a paraxial region thereof and an image-side surface 662 being convex in a paraxial region thereof. The sixth lens element 660 is made of plastic material and has the object-side surface 661 and the image-side surface 662 being both aspheric.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The image-side surface 672 of the seventh lens element 670 has at least one critical point in an off-axis region thereof.

The IR-cut filter 680 is made of glass material and located between the seventh lens element 670 and the image surface 690, and will not affect the focal length of the photographing optical lens assembly. The image sensor 695 is disposed on or near the image surface 690 of the photographing optical lens assembly.

The detailed optical data of the 6th embodiment are shown in Table 11 and the aspheric surface data are shown in Table 12 below.

TABLE 11

6th Embodiment
f = 2.59 mm, Fno = 1.62, HFOV = 52.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −4.987 (ASP) | 0.200 | Plastic | 1.559 | 40.4 | −4.35 |
| 2 | | 4.811 (ASP) | 0.800 | | | | |
| 3 | Lens 2 | −168.539 (ASP) | 0.243 | Plastic | 1.642 | 22.5 | 22.77 |
| 4 | | −13.450 (ASP) | 0.687 | | | | |
| 5 | Ape. Stop | Plano | −0.369 | | | | |
| 6 | Lens 3 | 1.905 (ASP) | 0.852 | Plastic | 1.544 | 56.0 | 2.15 |
| 7 | | −2.538 (ASP) | 0.341 | | | | |
| 8 | Lens 4 | 98.094 (ASP) | 0.200 | Plastic | 1.671 | 19.5 | −3.89 |
| 9 | | 2.542 (ASP) | 0.120 | | | | |
| 10 | Lens 5 | 2.980 (ASP) | 0.347 | Plastic | 1.544 | 56.0 | 15.37 |
| 11 | | 4.439 (ASP) | 0.505 | | | | |
| 12 | Lens 6 | ∞ (ASP) | 0.426 | Plastic | 1.544 | 56.0 | 1.91 |
| 13 | | −1.038 (ASP) | 0.234 | | | | |
| 14 | Lens 7 | 9.834 (ASP) | 0.250 | Plastic | 1.559 | 40.4 | −1.84 |
| 15 | | 0.921 (ASP) | 0.600 | | | | |
| 16 | IR-cut filter | Plano | 0.210 | Glass | 1.517 | 64.2 | — |
| 17 | | Plano | 0.357 | | | | |
| 18 | Image | Plano | — | | | | |

Note:
Reference wavelength is 587.6 nm (d-line).
An effective radius of the object-side surface 641 (Surface 8) is 1.000 mm.
An effective radius of the object-side surface 661 (Surface 12) is 1.400 mm.

TABLE 12

Aspheric Coefficients

| Surface # | 1 | 2 | 3 | 4 | 6 |
|---|---|---|---|---|---|
| k = | −4.1547E+01 | 5.5345E+00 | 9.0000E+01 | −8.5448E+01 | −5.5398E+00 |
| A4 = | 1.6390E−01 | 2.1370E−01 | −1.2602E−01 | −1.6075E−01 | 4.4110E−02 |
| A6 = | −1.8396E−01 | −9.2882E−02 | 1.3688E−01 | 2.5106E−01 | −7.5758E−03 |
| A8 = | 1.4270E−01 | −2.4413E−01 | −5.0029E−01 | −8.6338E−01 | 3.7818E−02 |
| A10 = | −7.8204E−02 | 6.8136E−01 | 1.0284E+00 | 2.0413E+00 | −5.3096E−02 |
| A12 = | 2.9012E−02 | −8.4602E−01 | −1.3017E+00 | −2.9960E+00 | 1.4782E−02 |
| A14 = | −6.7915E−03 | 5.9588E−01 | 1.0187E+00 | 2.7312E+00 | 1.9911E−02 |
| A16 = | 8.6990E−04 | −2.3945E−01 | −4.7271E−01 | −1.5012E+00 | −2.1803E−03 |
| A18 = | −3.7188E−05 | 4.9152E−02 | 1.1946E−01 | 4.5713E−01 | −1.4052E−02 |
| A20 = | −1.7776E−06 | −3.7126E−03 | −1.2731E−02 | −5.9216E−02 | 6.3344E−03 |

| Surface # | 7 | 8 | 9 | 10 | 11 |
|---|---|---|---|---|---|
| k = | −1.9885E+00 | −8.3883E+01 | 3.2321E+00 | −3.1534E+01 | −7.5508E+01 |
| A4 = | 1.8701E−02 | 1.2181E−01 | 1.2724E−01 | 3.4410E−02 | −4.4873E−02 |
| A6 = | −5.1818E−02 | −3.9314E−01 | −5.0698E−01 | −1.8171E−01 | −2.8717E−01 |
| A8 = | 6.1134E−02 | 4.5891E−01 | 6.1782E−01 | 3.5826E−01 | 1.0078E+00 |
| A10 = | −4.1821E−02 | −2.7188E−01 | 6.8228E−01 | −1.2665E−01 | −2.3699E+00 |
| A12 = | 4.2456E−04 | 3.3152E−02 | −4.2317E+00 | −5.2256E−01 | 3.8020E+00 |
| A14 = | 3.3802E−02 | 3.7634E−02 | 7.5828E+00 | 9.5517E−01 | −3.9075E+00 |
| A16 = | −1.4127E−03 | −5.5118E−03 | −6.9730E+00 | −7.0999E−01 | 2.4415E+00 |
| A18 = | −3.2063E−02 | −9.6964E−03 | 3.3026E+00 | 2.4927E−01 | −8.2225E−01 |
| A20 = | 1.5837E−02 | 5.2138E−03 | −6.3905E−01 | −3.5248E−02 | 1.1121E−01 |

| Surface # | 12 | 13 | 14 | 15 |
|---|---|---|---|---|
| k = | 0.0000E+00 | −4.3296E+00 | 1.6997E+01 | −5.3548E+00 |
| A4 = | −1.9997E−02 | 1.3232E−01 | −1.7388E−02 | −1.0225E−01 |
| A6 = | 2.9946E−01 | 3.2964E−02 | −1.3451E−01 | 4.4459E−02 |
| A8 = | −8.2123E−01 | −2.3873E−01 | 1.6910E−01 | −1.0942E−02 |
| A10 = | 1.4357E+00 | 5.1013E−01 | −9.1063E−02 | 8.7267E−04 |
| A12 = | −1.7732E+00 | −5.5666E−01 | 2.5360E−02 | 3.7111E−04 |
| A14 = | 1.4714E+00 | 3.2657E−01 | −3.1995E−03 | −1.7302E−04 |
| A16 = | −7.7538E−01 | −1.0616E−01 | −4.3849E−05 | 3.7162E−05 |
| A18 = | 2.2982E−01 | 1.8133E−02 | 5.3778E−05 | −4.2762E−06 |
| A20 = | −2.8602E−02 | −1.2686E−03 | −3.9517E−06 | 2.0282E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.59 | $|f4/f5|$ | 0.25 |
| Fno | 1.62 | $|f6/f5|$ | 0.12 |
| HFOV [deg.] | 52.5 | $|f7/f5|$ | 0.12 |
| FOV [deg.] | 105.0 | $|f7/f1|$ | 0.42 |
| V2 | 22.5 | $|f7/f2|$ | 0.08 |
| V6/V7 | 1.38 | $|f7/f3|$ | 0.86 |
| CT2/(T12 + T23) | 0.22 | $|f7/f4|$ | 0.47 |
| CT2/CT3 | 0.29 | $|f7/f5|$ | 0.12 |
| ΣAT/(T12 + T56) | 1.78 | $|f7/f6|$ | 0.96 |
| TL/ImgH | 1.95 | $|f3/f2|$ | 0.09 |
| f/R1 | −0.52 | $|f1/f2|$ | 0.19 |
| (R11 + R12)/(R11 − R12) | 1.00 | $|f/f6| + |f/f7|$ | 2.76 |
| $|f1/f5|$ | 0.28 | Y11/Y72 | 0.68 |
| $|f2/f5|$ | 1.48 | Y72/f | 0.94 |
| $|f3/f5|$ | 0.14 | — | — |

7th Embodiment

Figure 13:
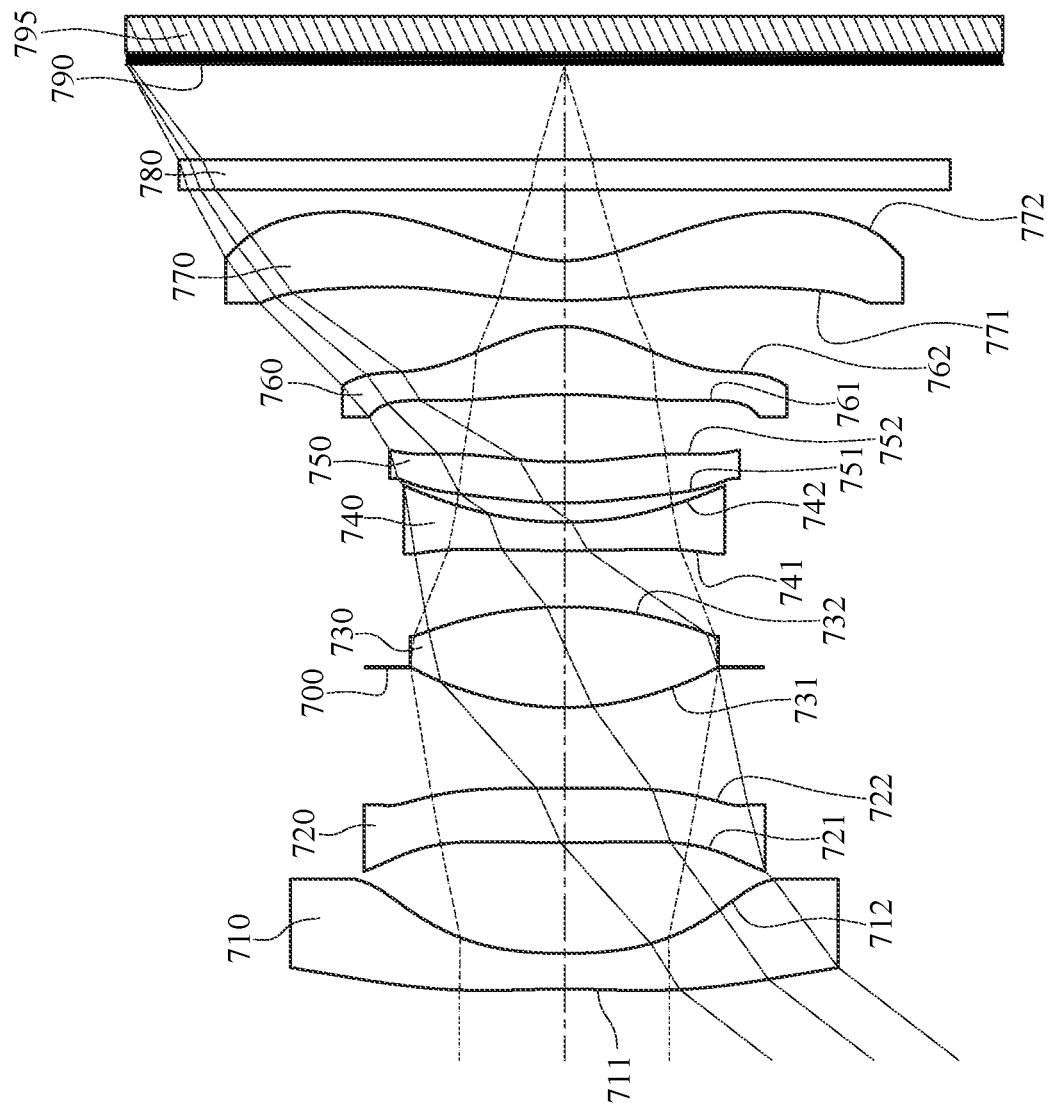
FIG. 13 is a schematic view of an image capturing unit according to the 7th embodiment of the present disclosure.
Figure 14:
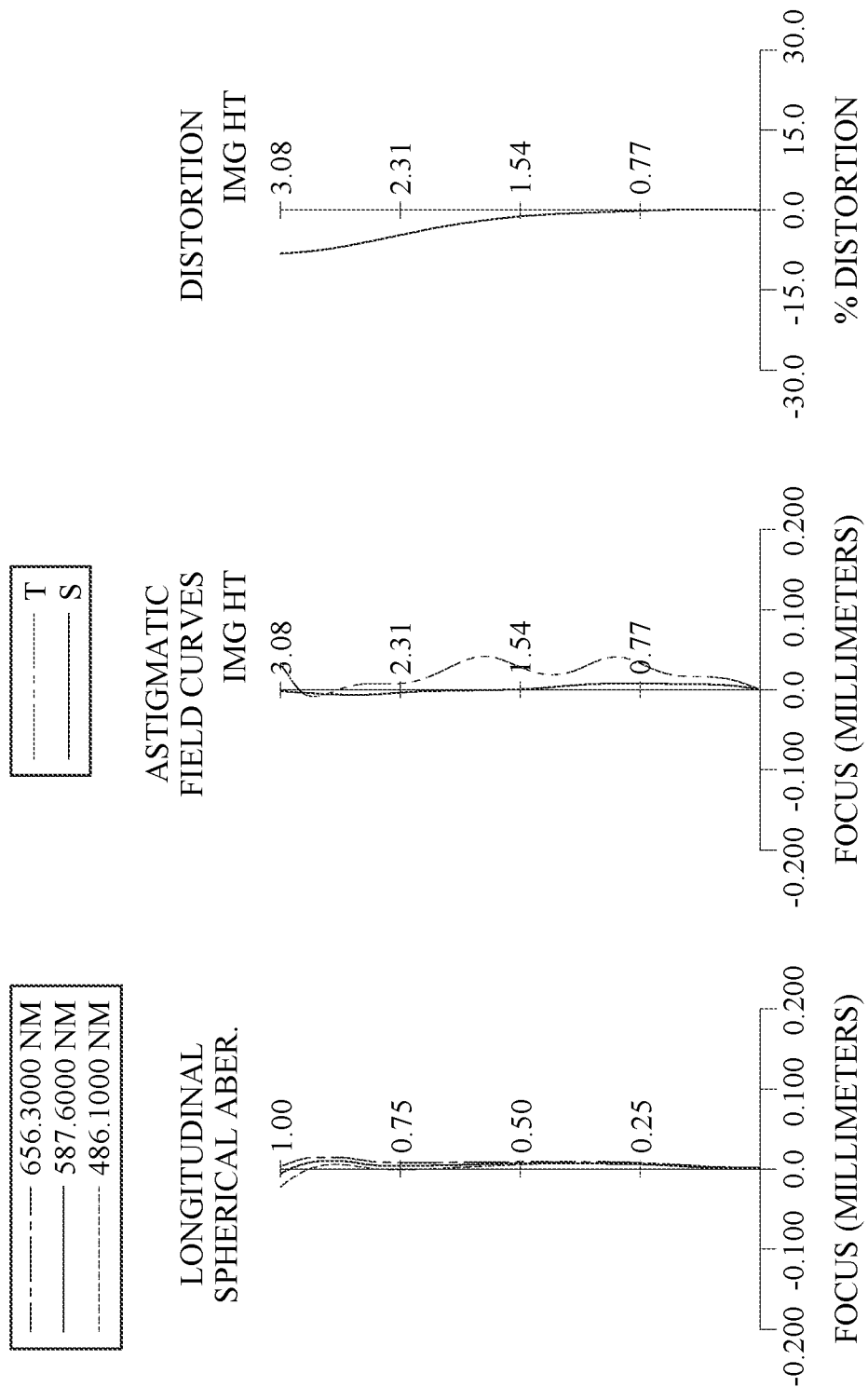
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 795. The photographing optical lens assembly includes, in order from an object side to an image side, a first lens element 710, a second lens element 720, an aperture stop 700, a third lens element 730, a fourth lens element 740, a fifth lens element 750, a sixth lens element 760, a seventh lens element 770, an IR-cut filter 780 and an image surface 790. The photographing optical lens assembly includes seven single and non-cemented lens elements (710, 720, 730, 740, 750, 760 and 770) with no additional lens element disposed between each of the adjacent seven lens elements, wherein there is an air gap between every adjacent lens element.

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with positive refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The image-side surface 772 of the seventh lens element 770 has at least one critical point in an off-axis region thereof.

The IR-cut filter 780 is made of glass material and located between the seventh lens element 770 and the image surface 790, and will not affect the focal length of the photographing optical lens assembly. The image sensor 795 is disposed on or near the image surface 790 of the photographing optical lens assembly.

The detailed optical data of the 7th embodiment are shown in Table 13 and the aspheric surface data are shown in Table 14 below.

TABLE 13

7th Embodiment
f = 2.58 mm, Fno = 1.75, HFOV = 52.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −6.787 (ASP) | 0.250 | Plastic | 1.559 | 40.4 | −4.28 |
| 2 | | 3.736 (ASP) | 0.778 | | | | |
| 3 | Lens 2 | 8.543 (ASP) | 0.382 | Plastic | 1.639 | 23.5 | 18.35 |
| 4 | | 30.976 (ASP) | 0.851 | | | | |
| 5 | Ape. Stop | Plano | −0.281 | | | | |
| 6 | Lens 3 | 1.964 (ASP) | 0.707 | Plastic | 1.543 | 56.5 | 2.23 |
| 7 | | −2.750 (ASP) | 0.396 | | | | |

TABLE 13-continued

7th Embodiment
f = 2.58 mm, Fno = 1.75, HFOV = 52.5 deg.

| Surface # |  | Curvature Radius | Thickness | Material | Index | Abbe # | Focal Length |
|---|---|---|---|---|---|---|---|
| 8 | Lens 4 | 20.938 (ASP) | 0.200 | Plastic | 1.671 | 19.5 | −4.75 |
| 9 |  | 2.754 (ASP) | 0.135 |  |  |  |  |
| 10 | Lens 5 | 3.021 (ASP) | 0.288 | Plastic | 1.543 | 56.5 | −82.34 |
| 11 |  | 2.735 (ASP) | 0.475 |  |  |  |  |
| 12 | Lens 6 | −4.022 (ASP) | 0.477 | Plastic | 1.543 | 56.5 | 1.63 |
| 13 |  | −0.756 (ASP) | 0.185 |  |  |  |  |
| 14 | Lens 7 | 7.139 (ASP) | 0.278 | Plastic | 1.582 | 30.2 | −1.81 |
| 15 |  | 0.903 (ASP) | 0.500 |  |  |  |  |
| 16 | IR-cut filter | Plano | 0.210 | Glass | 1.517 | 64.2 | — |
| 17 |  | Plano | 0.670 |  |  |  |  |
| 18 | Image | Plano | — |  |  |  |  |

Note:
Reference wavelength is 587.6 nm (d-line).
An effective radius of the object-side surface 741 (Surface 8) is 1.050 mm.

TABLE 14

Aspheric Coefficients

| Surface # | 1 | 2 | 3 | 4 | 6 |
|---|---|---|---|---|---|
| k = | −6.8054E+01 | 4.5345E+00 | −6.0692E+00 | 9.6912E+00 | −4.5712E+00 |
| A4 = | 1.4643E−01 | 1.6595E−01 | −1.0085E−01 | −1.2110E−01 | 3.6821E−02 |
| A6 = | −1.4438E−01 | −1.2991E−03 | 4.8996E−02 | 8.4248E−02 | −2.6662E−02 |
| A8 = | 1.0742E−01 | −4.2241E−01 | −1.5049E−01 | −1.8938E−01 | 3.8997E−02 |
| A10 = | −5.9331E−02 | 9.8067E−01 | 2.4051E−01 | 3.4807E−01 | −4.4109E−02 |
| A12 = | 2.2586E−02 | −1.2120E+00 | −2.3187E−01 | −3.8774E−01 | 1.7611E−02 |
| A14 = | −5.5307E−03 | 8.8862E−01 | 1.3565E−01 | 2.5757E−01 | 1.8106E−02 |
| A16 = | 7.9451E−04 | −3.8419E−01 | −4.4992E−02 | −9.1084E−02 | −6.8535E−03 |
| A18 = | −5.5944E−05 | 8.9587E−02 | 7.7272E−03 | 1.2176E−02 | −1.6123E−02 |
| A20 = | 1.1243E−06 | −8.6265E−03 | −5.4058E−04 | 7.0121E−04 | 1.0188E−02 |

| Surface # | 7 | 8 | 9 | 10 | 11 |
|---|---|---|---|---|---|
| k = | −9.8879E−01 | 7.6113E+01 | 3.5365E+00 | −3.1923E+01 | −2.1927E+01 |
| A4 = | 9.8167E−03 | 1.0994E−01 | 2.0626E−01 | 1.0922E−01 | −9.3281E−03 |
| A6 = | −5.5611E−02 | −4.1590E−01 | −9.3714E−01 | −7.5563E−01 | −2.1461E−01 |
| A8 = | 7.2976E−02 | 4.6643E−01 | 2.5696E+00 | 1.9147E+00 | 6.6466E−02 |
| A10 = | −4.8491E−02 | −2.5845E−01 | −5.4146E+00 | −2.5619E+00 | 6.5822E−01 |
| A12 = | 2.1606E−03 | 3.3776E−02 | 8.0722E+00 | 1.7708E+00 | −1.3925E+00 |
| A14 = | 3.0430E−02 | 3.7013E−02 | −7.9958E+00 | −1.4414E−01 | 1.3910E+00 |
| A16 = | −4.0016E−03 | −5.9501E−03 | 4.9550E+00 | −6.8800E−01 | −7.6204E−01 |
| A18 = | −2.7838E−02 | −1.1235E−02 | −1.7353E+00 | 4.5572E−01 | 2.2387E−01 |
| A20 = | 1.6019E−02 | 4.5891E−03 | 2.6178E−01 | −9.5236E−02 | −2.8692E−02 |

| Surface # | 12 | 13 | 14 | 15 |
|---|---|---|---|---|
| k = | −8.9997E+01 | −4.9340E+00 | 8.2971E+00 | −6.8185E+00 |
| A4 = | −1.9350E−01 | −2.6849E−01 | 1.9188E−01 | 2.0656E−02 |
| A6 = | 1.0886E+00 | 1.1722E+00 | −3.9218E−01 | −9.0751E−02 |
| A8 = | −2.5664E+00 | −2.2084E+00 | 3.4581E−01 | 7.2072E−02 |
| A10 = | 3.7474E+00 | 2.5868E+00 | −1.8788E−01 | −3.2353E−02 |
| A12 = | −3.6245E+00 | −1.8792E+00 | 6.7209E−02 | 8.9940E−03 |
| A14 = | 2.3452E+00 | 8.3154E−01 | −1.5795E−02 | −1.5563E−03 |
| A16 = | −9.9881E−01 | −2.1587E−01 | 2.3348E−03 | 1.6101E−04 |
| A18 = | 2.4639E−01 | 2.9684E−02 | −1.9637E−04 | −9.0083E−06 |
| A20 = | −2.7486E−02 | −1.6111E−03 | 7.1613E−06 | 2.0621E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.58 | |f4/f5| | 0.06 |
| Fno | 1.75 | |f6/f5| | 0.02 |
| HFOV [deg.] | 52.5 | |f7/f5| | 0.02 |
| FOV [deg.] | 105.0 | |f7/f1| | 0.42 |
| V2 | 23.5 | |f7/f2| | 0.10 |
| V6/V7 | 1.87 | |f7/f3| | 0.81 |
| CT2/(T12 + T23) | 0.28 | |f7/f4| | 0.38 |

-continued

| 7th Embodiment | | | |
|---|---|---|---|
| CT2/CT3 | 0.54 | \|f7/f5\| | 0.02 |
| ΣAT/(T12 + T56) | 2.03 | \|f7/f6\| | 1.11 |
| TL/ImgH | 2.11 | \|f3/f2\| | 0.12 |
| f/R1 | −0.38 | \|f1/f2\| | 0.23 |
| (R11 + R12)/(R11 − R12) | 1.46 | \|f/f6\| + \|f/f7\| | 3.01 |
| \|f1/f5\| | 0.05 | Y11/Y72 | 0.81 |
| \|f2/f5\| | 0.22 | Y72/f | 0.92 |
| \|f3/f5\| | 0.03 | — | — |

8th Embodiment

Figure 15:
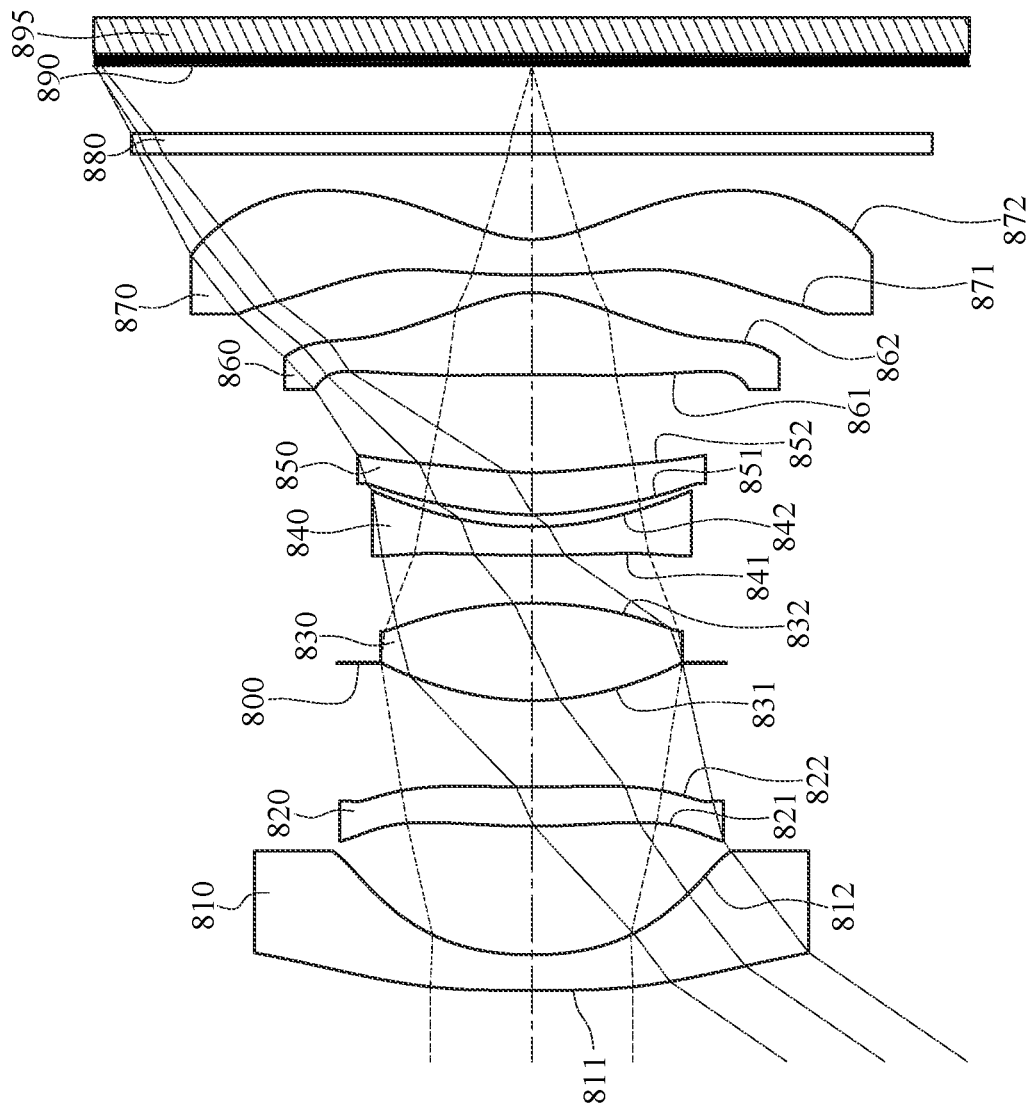
FIG. 15 is a schematic view of an image capturing unit according to the 8th embodiment of the present disclosure.
Figure 16:
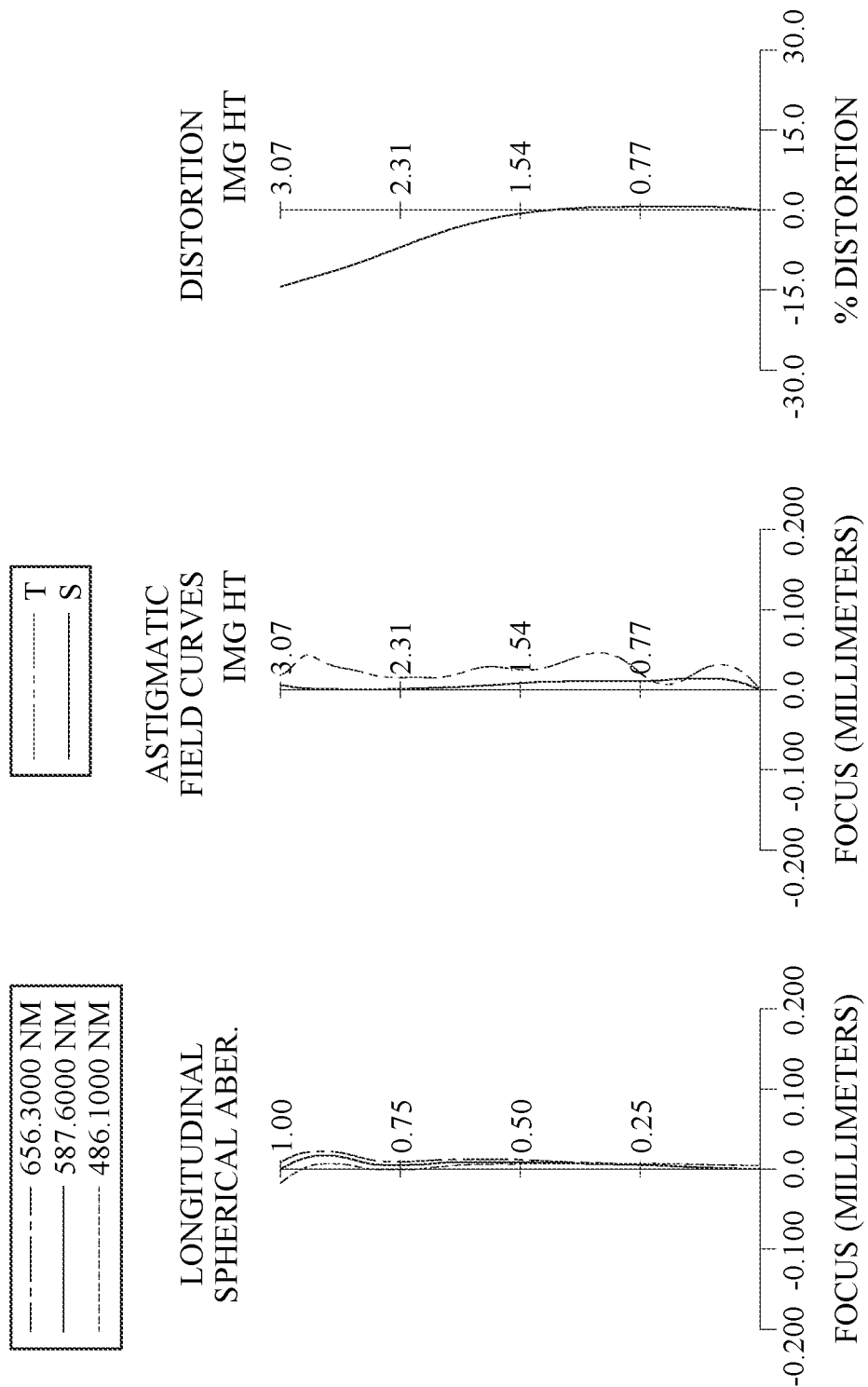
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 895. The photographing optical lens assembly includes, in order from an object side to an image side, a first lens element 810, a second lens element 820, an aperture stop 800, a third lens element 830, a fourth lens element 840, a fifth lens element 850, a sixth lens element 860, a seventh lens element 870, an IR-cut filter 880 and an image surface 890. The photographing optical lens assembly includes seven single and non-cemented lens elements (810, 820, 830, 840, 850, 860 and 870) with no additional lens element disposed between each of the adjacent seven lens elements, wherein there is an air gap between every adjacent lens element.

The first lens element 810 with negative refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric.

The sixth lens element 860 with positive refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric.

The seventh lens element 870 with negative refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The image-side surface 872 of the seventh lens element 870 has at least one critical point in an off-axis region thereof.

The IR-cut filter 880 is made of glass material and located between the seventh lens element 870 and the image surface 890, and will not affect the focal length of the photographing optical lens assembly. The image sensor 895 is disposed on or near the image surface 890 of the photographing optical lens assembly.

The detailed optical data of the 8th embodiment are shown in Table 15 and the aspheric surface data are shown in Table 16 below.

TABLE 15

8th Embodiment
f = 2.49 mm, Fno = 1.75, HFOV = 55.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 74.047 (ASP) | 0.250 | Plastic | 1.566 | 37.4 | −4.08 |
| 2 | | 2.236 (ASP) | 0.905 | | | | |
| 3 | Lens 2 | 5.500 (ASP) | 0.275 | Plastic | 1.660 | 20.4 | 16.51 |
| 4 | | 10.883 (ASP) | 0.875 | | | | |
| 5 | Ape. Stop | Plano | −0.266 | | | | |
| 6 | Lens 3 | 2.032 (ASP) | 0.684 | Plastic | 1.544 | 56.0 | 2.26 |
| 7 | | −2.739 (ASP) | 0.337 | | | | |
| 8 | Lens 4 | 17.563 (ASP) | 0.200 | Plastic | 1.688 | 18.7 | −4.24 |
| 9 | | 2.491 (ASP) | 0.085 | | | | |
| 10 | Lens 5 | 2.168 (ASP) | 0.297 | Plastic | 1.544 | 56.0 | 14.68 |
| 11 | | 2.833 (ASP) | 0.687 | | | | |
| 12 | Lens 6 | −30.590 (ASP) | 0.578 | Plastic | 1.544 | 56.0 | 1.47 |
| 13 | | −0.785 (ASP) | 0.123 | | | | |
| 14 | Lens 7 | 8.684 (ASP) | 0.250 | Plastic | 1.574 | 37.1 | −1.45 |
| 15 | | 0.749 (ASP) | 0.600 | | | | |

TABLE 15-continued

8th Embodiment
f = 2.49 mm, Fno = 1.75, HFOV = 55.5 deg.

| Surface # | | Curvature Radius | Thickness | Material | Index | Abbe # | Focal Length |
|---|---|---|---|---|---|---|---|
| 16 | IR-cut filter | Plano | 0.145 | Glass | 1.517 | 64.2 | — |
| 17 | | Plano | 0.477 | | | | |
| 18 | Image | Plano | — | | | | |

Note:
Reference wavelength is 587.6 nm (d-line).
An effective radius of the object-side surface 841 (Surface 8) is 1.050 mm.

TABLE 16

Aspheric Coefficients

| Surface # | 1 | 2 | 3 | 4 | 6 |
|---|---|---|---|---|---|
| k = | −3.2187E+01 | 1.2195E+00 | 1.2390E+00 | −8.0468E+01 | −3.9812E+00 |
| A4 = | 1.2415E−01 | 1.4893E−01 | −5.1575E−02 | −6.9567E−02 | 3.2102E−02 |
| A6 = | −1.0249E−01 | −1.1654E−01 | −1.6683E−01 | −1.4395E−01 | −3.1070E−02 |
| A8 = | 5.2246E−02 | 2.5350E−01 | 5.5417E−01 | 6.0153E−01 | 4.6532E−02 |
| A10 = | −1.6084E−02 | −7.3213E−01 | −1.2180E+00 | −1.5119E+00 | −4.6294E−02 |
| A12 = | 1.7548E−03 | 1.2296E+00 | 1.6451E+00 | 2.3745E+00 | 1.4714E−02 |
| A14 = | 6.4109E−04 | −1.1874E+00 | −1.3721E+00 | −2.3266E+00 | 1.7977E−02 |
| A16 = | −2.8752E−04 | 6.6172E−01 | 6.8446E−01 | 1.3838E+00 | −6.8544E−03 |
| A18 = | 4.5236E−05 | −1.9848E−01 | −1.8535E−01 | −4.5704E−01 | −1.3070E−02 |
| A20 = | −2.6624E−06 | 2.4700E−02 | 2.0865E−02 | 6.4638E−02 | 9.6697E−03 |

| Surface # | 7 | 8 | 9 | 10 | 11 |
|---|---|---|---|---|---|
| k = | −1.4055E+00 | −9.0000E+01 | 2.6419E+00 | −1.5484E+01 | −1.1961E+01 |
| A4 = | 7.7091E−03 | 1.1357E−01 | 9.2493E−02 | 2.3518E−03 | −1.1766E−01 |
| A6 = | −5.9502E−02 | −4.1155E−01 | −4.7951E−01 | −1.3776E−01 | 1.0823E−01 |
| A8 = | 7.2972E−02 | 4.6638E−01 | 1.2195E+00 | 5.6434E−01 | −1.6733E−01 |
| A10 = | −6.4541E−02 | −2.6185E−01 | −2.6563E+00 | −8.5387E−01 | 4.0328E−01 |
| A12 = | 4.8411E−02 | 3.5931E−02 | 4.2081E+00 | 5.2322E−01 | −6.1365E−01 |
| A14 = | −3.8134E−03 | 5.0792E−02 | −4.4053E+00 | 1.6570E−01 | 5.7053E−01 |
| A16 = | 2.2218E−04 | −3.5277E−03 | 2.8591E+00 | −4.7180E−01 | −3.2174E−01 |
| A18 = | −3.0881E−02 | −3.3116E−02 | −1.0398E+00 | 2.8117E−01 | 1.0119E−01 |
| A20 = | 2.1708E−02 | 1.4266E−02 | 1.6121E−01 | −5.9039E−02 | −1.3693E−02 |

| Surface # | 12 | 13 | 14 | 15 |
|---|---|---|---|---|
| k = | −9.0000E+01 | −6.2340E+00 | 1.2876E+01 | −5.6542E+00 |
| A4 = | −5.3645E−02 | −8.5137E−02 | 1.9012E−01 | 2.1612E−02 |
| A6 = | 4.5953E−01 | 5.8174E−01 | −5.1293E−01 | −1.5930E−01 |
| A8 = | −1.0707E+00 | −1.2240E+00 | 4.6558E−01 | 1.5989E−01 |
| A10 = | 1.3946E+00 | 1.4014E+00 | −2.3510E−01 | −8.9131E−02 |
| A12 = | −1.1316E+00 | −9.4570E−01 | 7.0917E−02 | 3.1158E−02 |
| A14 = | 5.8994E−01 | 3.8813E−01 | −1.2316E−02 | −6.9938E−03 |
| A16 = | −1.9524E−01 | −9.5609E−02 | 1.0399E−03 | 9.7875E−04 |
| A18 = | 3.7793E−02 | 1.3008E−02 | −1.3414E−05 | −7.7576E−05 |
| A20 = | −3.2999E−03 | −7.5089E−04 | −2.4178E−06 | 2.6512E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.49 | |f4/f5| | 0.29 |
| Fno | 1.75 | |f6/f5| | 0.10 |
| HFOV [deg.] | 55.5 | |f7/f5| | 0.10 |
| FOV [deg.] | 111.0 | |f7/f1| | 0.35 |
| V2 | 20.4 | |f7/f2| | 0.09 |
| V6/V7 | 1.51 | |f7/f3| | 0.64 |
| CT2/(T12 + T23) | 0.18 | |f7/f4| | 0.34 |
| CT2/CT3 | 0.40 | |f7/f5| | 0.10 |
| ΣAT/(T12 + T56) | 1.72 | |f7/f6| | 0.98 |
| TL/ImgH | 2.11 | |f3/f2| | 0.14 |
| f/R1 | 0.03 | |f1/f2| | 0.25 |
| (R11 + R12)/(R11 − R12) | 1.05 | |f6| + |f7| | 3.41 |
| |f1/f5| | 0.28 | Y11/Y72 | 0.79 |
| |f2/f5| | 1.12 | Y72/f | 0.96 |
| |f3/f5| | 0.15 | — | — |

9th Embodiment

Figure 17:
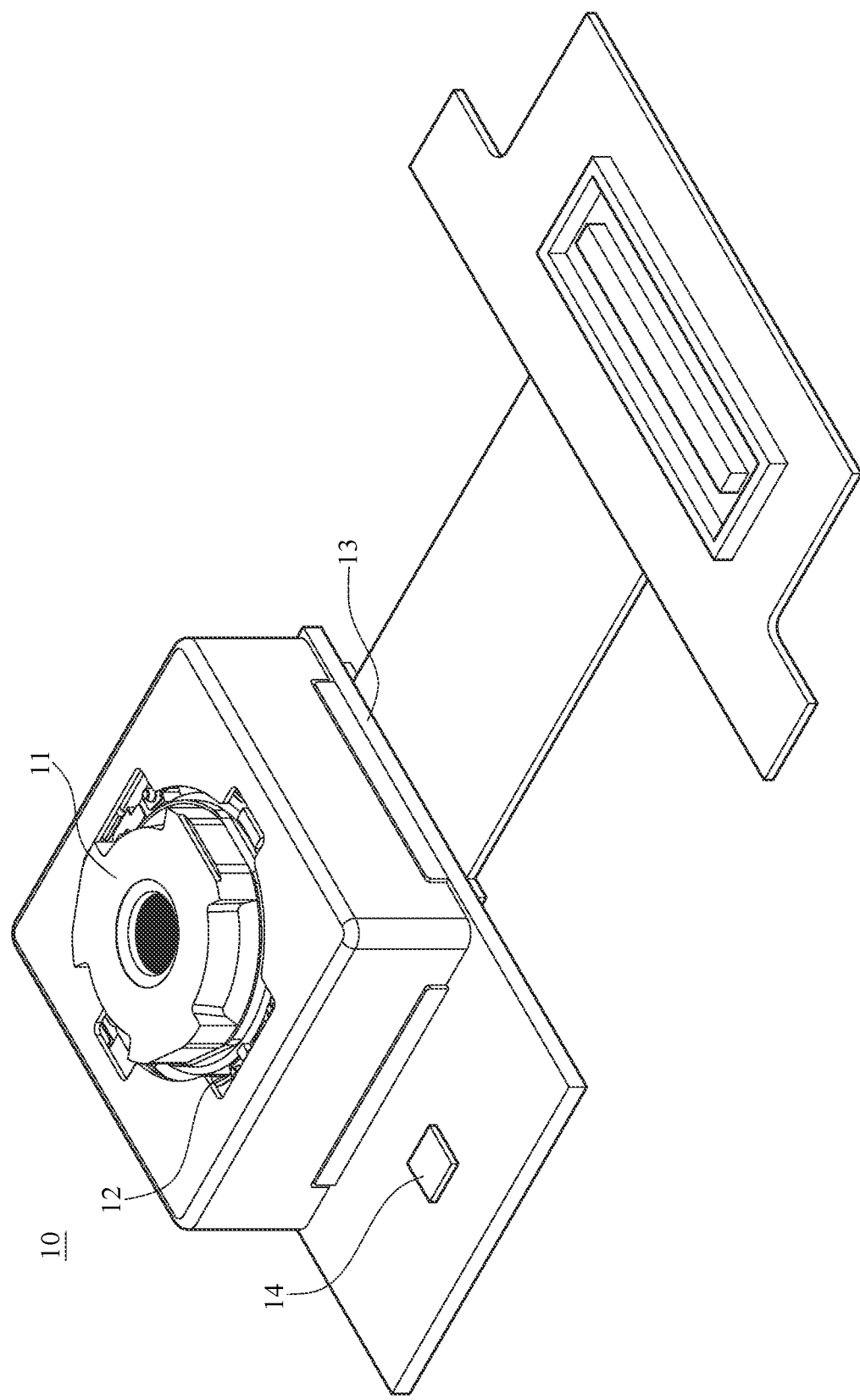
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit is a camera module including a lens unit 11, a driving device 12, an image sensor 13 and an image stabilizer 14. The lens unit 11 includes the photographing optical lens assembly of the present disclosure, a barrel and a holder member (their reference numerals are omitted) for holding the photographing optical lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 18:
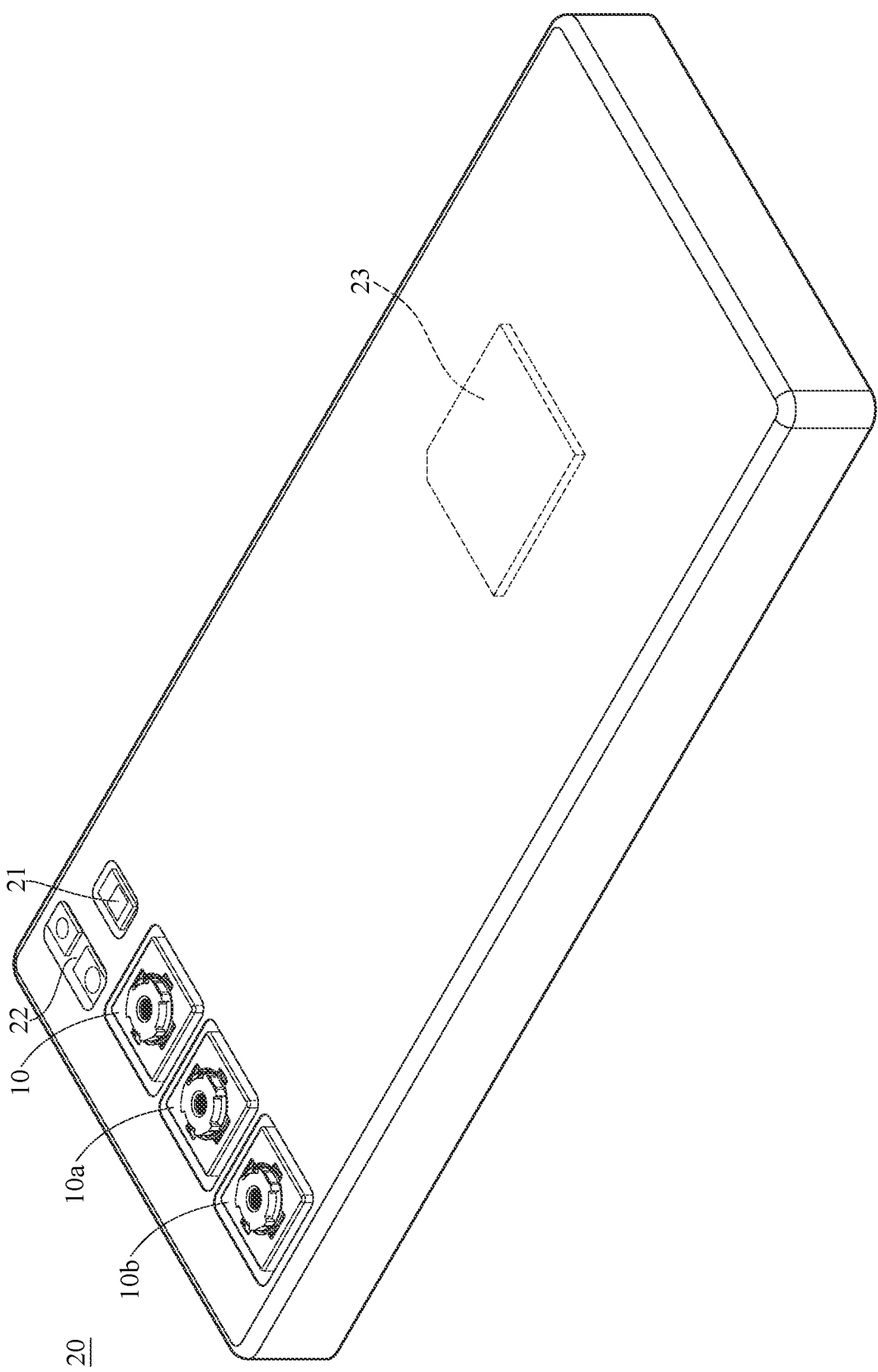
FIG. 18 is one perspective view of an electronic device according to the 10th embodiment of the present disclosure.
Figure 19:
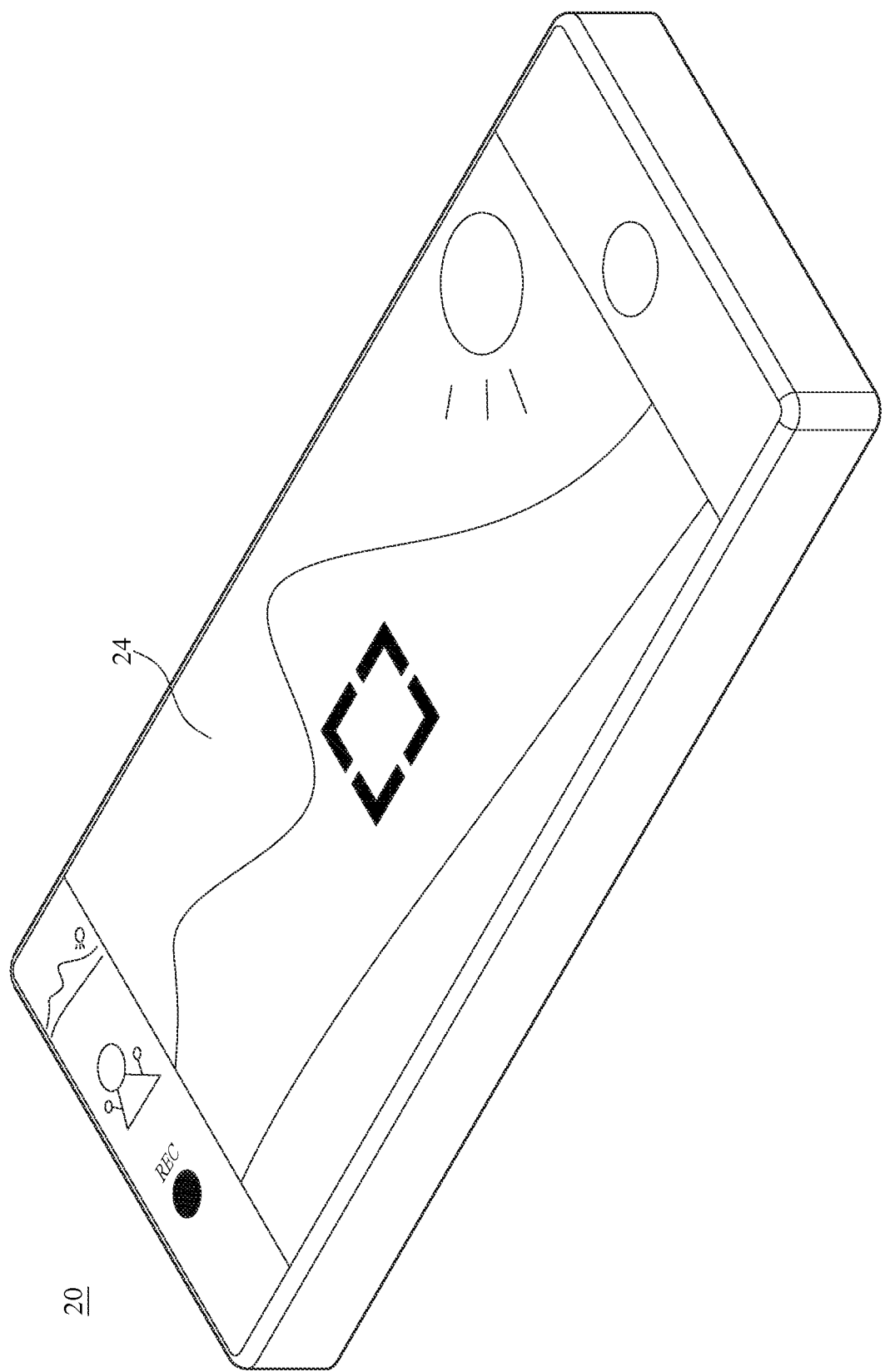
FIG. 19 is another perspective view of the electronic device in FIG. 18.
Figure 20:
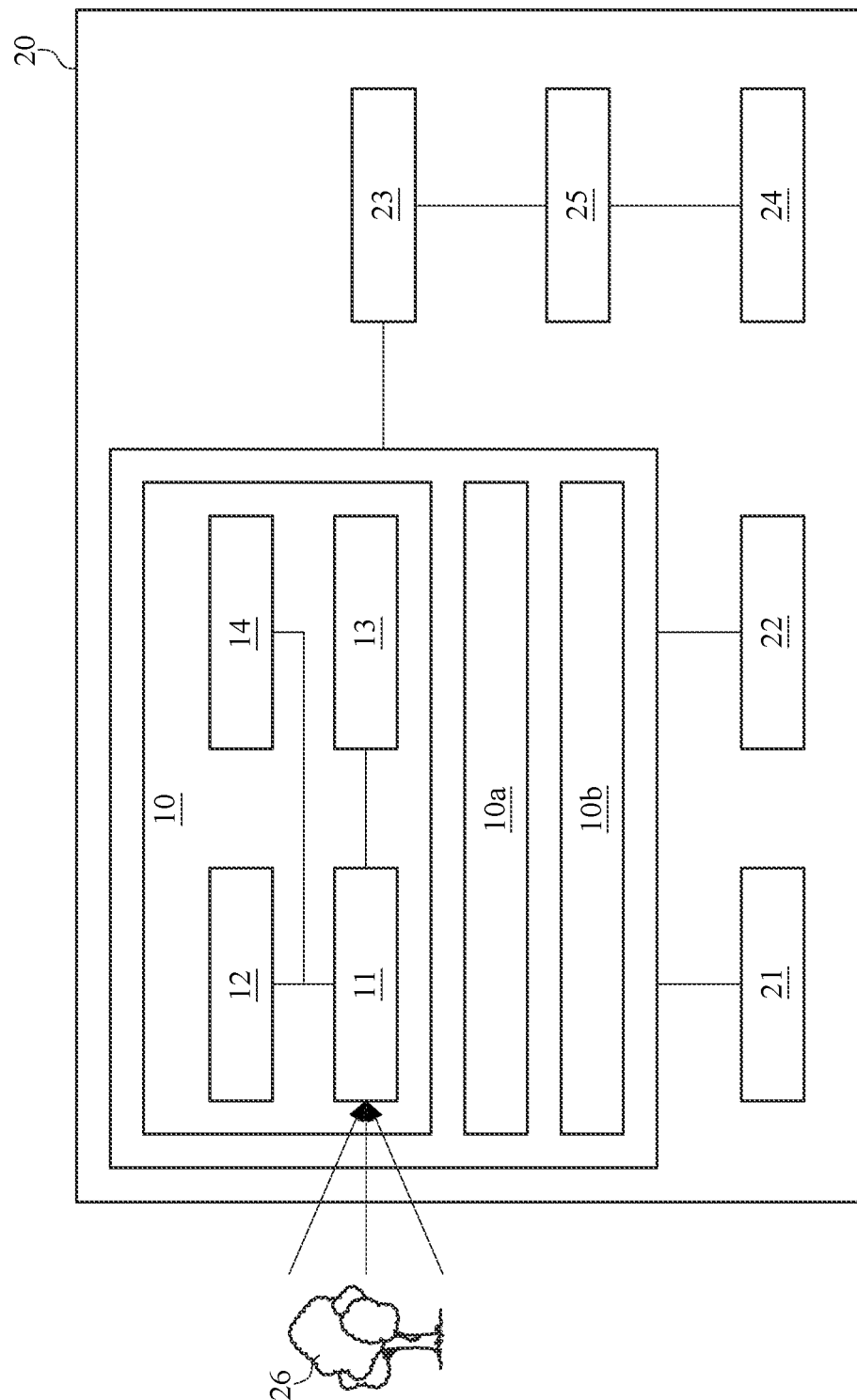
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18. In this embodiment, an electronic device 20 is a smartphone including the image capturing unit 10 disclosed in the 9th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the mage capturing units 10, 10a and 10b has a single focal point. Furthermore, each of the image capturing unit 10a and the image capturing unit 10b has a configuration similar to that of the image capturing unit 10. In detail, each of the image capturing unit 10a and the image capturing unit 10b includes a lens unit, a driving device, an image sensor and an image stabilizer, and the lens unit includes a lens system, a barrel and a holder member for holding the lens system.

In this embodiment, the image capturing unit 10 is a wide-angle image capturing unit, the image capturing unit 10a is a standard image capturing unit, and the image capturing unit 10b is a telephoto image capturing unit. The image capturing unit 10 has a relatively large field of view ranging from 90 to 180 degrees. The image capturing unit 10b has a relatively small field of view ranging from 10 to degrees. The image capturing unit 10a has a field of view ranging between that of the image capturing unit 10 and the image capturing unit 10b, and the field of view of the image capturing unit 10a may range from 60 to 90 degrees. Since the image capturing units 10, 10a, 10b have different fields of view from one another, the electronic device 20 has various magnification ratios so as to meet the requirement of optical zoom functionality. In this embodiment, the electronic device 20 includes multiple image capturing units 10, 10a and 10b, but the present disclosure is not limited to the number of image capturing units.

When a user captures images of an object 26, the light rays converge in the image capturing unit 10, the image capturing unit 10a or the image capturing unit 10b to generate an image, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element;

wherein the first lens element with negative refractive power has an object-side surface being concave in a paraxial region thereof, the second lens element has an image-side surface being concave in a paraxial region thereof, the third lens element has positive refractive power, the fourth lens element has negative refractive power, and the seventh lens element with negative refractive power has an image-side surface having at least one critical point in an off-axis region thereof; and wherein a focal length of the photographing optical lens assembly is f, a curvature radius of the object-side surface of the first lens element is R1, a maximum effective radius of the image-side surface of the seventh lens element is Y72, and the following conditions are satisfied:

$$f/R1 \le 0; \text{ and}$$
$$0.75 < Y72/f.$$

2. The photographing optical lens assembly of claim 1, wherein the seventh lens element has an object-side surface being convex in a paraxial region thereof and the image-side surface being concave in a paraxial region thereof.

3. The photographing optical lens assembly of claim 1, further comprising an aperture stop disposed on an object side of the third lens element,
wherein a focal length of the second lens element is f2, a focal length of the third lens element is f3, and the following condition is satisfied:

$$|f3/f2| < 0.75.$$

4. The photographing optical lens assembly of claim 1, wherein an axial distance between the object-side surface of the first lens element and an image surface is TL, a maximum image height of the photographing optical lens assembly is ImgH, a central thickness of the second lens element is CT2, an axial distance between the first lens element and the second lens element is T12, an axial distance between the second lens element and the third lens element is T23, and the following conditions are satisfied:

$$TL/ImgH < 2.50; \text{ and}$$
$$0.25 \le CT2/(T12+T23) < 1.0.$$

5. The photographing optical lens assembly of claim 1, wherein a focal length of the first lens element is f1, a focal length of the second lens element is f2, and the following condition is satisfied:

$$|f1/f2| < 0.95.$$

6. The photographing optical lens assembly of claim 1, wherein an absolute value of a curvature radius of an image-side surface of the third lens element is smaller than an absolute value of a curvature radius of an image-side surface of the first lens element; and wherein a maximum field of view of the photographing optical lens assembly is FOV, and the following condition is satisfied:

$$100 \text{ degrees} < FOV < 200 \text{ degrees}.$$

7. The photographing optical lens assembly of claim 1, wherein an axial distance between the fourth lens element and the fifth lens element is smaller than an axial distance between the sixth lens element and the seventh lens element.

8. The photographing optical lens assembly of claim 1, wherein an axial distance between the fourth lens element and the fifth lens element is smaller than an axial distance between the third lens element and the fourth lens element.

9. An image capturing unit, comprising:
the photographing optical lens assembly of claim 1; and
an image sensor disposed on an image surface of the photographing optical lens assembly.

10. An electronic device, comprising:
the image capturing unit of claim 9.

11. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element;
wherein the first lens element with negative refractive power has an object-side surface being concave in a paraxial region thereof, the third lens element with positive refractive power has an image-side surface being convex in a paraxial region thereof, the fifth lens element has positive refractive power, and the seventh lens element with negative refractive power has an image-side surface having at least one critical point in an off-axis region thereof; and
wherein a focal length of the photographing optical lens assembly is f, a curvature radius of the object-side surface of the first lens element is R1, a maximum effective radius of the image-side surface of the seventh lens element is Y72, and the following conditions are satisfied:

$$f/R1 \le 0; \text{ and}$$
$$0.75 < Y72/f.$$

12. The photographing optical lens assembly of claim 11, wherein the fourth lens element has negative refractive power.

13. The photographing optical lens assembly of claim 11, wherein a central thickness of the second lens element is CT2, an axial distance between the first lens element and the second lens element is T12, an axial distance between the second lens element and the third lens element is T23, and the following condition is satisfied:

$$0.25 \le CT2/(T12+T23) < 1.0.$$

14. The photographing optical lens assembly of claim 11, wherein a focal length of the second lens element is f2, a focal length of the third lens element is f3, and the following condition is satisfied:

$$|f3/f2| < 1.20.$$

15. The photographing optical lens assembly of claim 11, wherein an absolute value of a curvature radius of an image-side surface of the fifth lens element is smaller than an absolute value of a curvature radius of an image-side surface of the first lens element; and wherein an axial distance between the object-side surface of the first lens element and an image surface is TL, a maximum image height of the photographing optical lens assembly is ImgH, and the following condition is satisfied:

$$TL/ImgH \leq 1.89.$$

16. The photographing optical lens assembly of claim 11, wherein a maximum field of view of the photographing optical lens assembly is FOV, a focal length of the first lens element is f1, a focal length of the second lens element is f2, and the following conditions are satisfied:

$$105.0 \text{ degrees} \leq FOV < 200 \text{ degrees; and}$$

$$|f1/f2| < 0.95.$$

17. The photographing optical lens assembly of claim 11, wherein the maximum effective radius of the image-side surface of the seventh lens element is Y72, the focal length of the photographing optical lens assembly is f, and the following condition is satisfied:

$$0.77 \leq Y72/f.$$

18. The photographing optical lens assembly of claim 11, wherein an axial distance between the fourth lens element and the fifth lens element is smaller than an axial distance between the sixth lens element and the seventh lens element.

19. The photographing optical lens assembly of claim 11, wherein a curvature radius of an image-side surface of the first lens element and a curvature radius of an image-side surface of the sixth lens element have different signs.

20. An electronic device, comprising at least two image capturing units, the at least two image capturing units facing the same side, and the at least two image capturing units comprising:

a first image capturing unit, comprising a lens system and a first image sensor, wherein the first image sensor is disposed on an image surface of the lens system; and a second image capturing unit, comprising the photographing optical lens assembly of claim 11 and a second image sensor, wherein the second image sensor is disposed on an image surface of the photographing optical lens assembly;

wherein the second image capturing unit has a field of view ranging from 90 degrees to 180 degrees.

* * * * *